US009934314B2

(12) United States Patent
Nagy

(10) Patent No.: US 9,934,314 B2
(45) Date of Patent: *Apr. 3, 2018

(54) SYSTEMS AND METHODS FOR IMPLEMENTING ACHIEVEMENT GUIDED RECOMMENDATIONS

(71) Applicant: GROUPFABRIC INC., Seattle, WA (US)

(72) Inventor: Alexander Felsöbüki Nagy, Seattle, WA (US)

(73) Assignee: GROUPFABRIC INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/081,684

(22) Filed: Mar. 25, 2016

(65) Prior Publication Data

US 2016/0210293 A1    Jul. 21, 2016

Related U.S. Application Data

(63) Continuation of application No. 13/800,834, filed on Mar. 13, 2013, now Pat. No. 9,390,182.

(60) Provisional application No. 61/691,042, filed on Aug. 20, 2012.

(51) Int. Cl.
| | | |
|---|---|---|
| A63F 9/24 | (2006.01) | |
| G06F 17/30 | (2006.01) | |
| A63F 13/79 | (2014.01) | |
| G06F 3/0484 | (2013.01) | |

(52) U.S. Cl.
CPC ........ *G06F 17/30867* (2013.01); *A63F 13/79* (2014.09); *G06F 3/04842* (2013.01); *G06F 17/3053* (2013.01); *G06F 17/30477* (2013.01); *G06F 17/30554* (2013.01)

(58) Field of Classification Search
CPC ........ A63F 13/12; A63F 13/69; A63F 13/798; A63F 2300/558; G06F 17/30867
See application file for complete search history.

(56) References Cited

U.S. PATENT DOCUMENTS

| | | |
|---|---|---|
| 2006/0122716 A1 | 6/2006 | Bortnik et al. |
| 2007/0173321 A1 | 7/2007 | Shen et al. |
| 2007/0173323 A1 | 7/2007 | Johnson et al. |
| 2007/0173327 A1 | 7/2007 | Kilgore et al. |

(Continued)

OTHER PUBLICATIONS

Non-Final Office Action, received in U.S. Appl. No. 13/800,974, dated Sep. 25, 2015.
Information Disclosure Statement Transmittal filed herewith.

*Primary Examiner* — Steve Rowland
(74) *Attorney, Agent, or Firm* — Davis Wright Tremaine, LLP; Heather M. Colburn

(57) ABSTRACT

A method performed by one or more computing devices. The method uses data identifying a plurality of users and a plurality of achievements. The data identifies which of the plurality of achievements each of the plurality of users has earned and when any such achievements were earned. The method includes ordering the plurality of achievements to define an ordered achievement list, and for each of the plurality of users, removing from the ordered achievement list any of the plurality of achievements identified in the data as having been earned by the user to define a recommended achievement list for the user. The method also includes identifying a selected achievement, and identifying as a set of similar users any of the plurality of users whose recommended achievement list includes the selected achievement.

27 Claims, 21 Drawing Sheets

(56) References Cited

U.S. PATENT DOCUMENTS

| | | |
|---|---|---|
| 2008/0113809 A1 | 5/2008 | David et al. |
| 2009/0082101 A1 | 3/2009 | Ostergren et al. |
| 2011/0250959 A1 | 10/2011 | Bortnik |
| 2013/0288757 A1 | 10/2013 | Guthridge |
| 2014/0052721 A1 | 2/2014 | Nagy |

| EarnedAchievement | | |
|---|---|---|
| GamerId | AchievementId | DateEarned |
| 1 | 1 | 4/15/2012 |
| 1 | 6 | 5/7/2012 |
| 1 | 5 | 4/29/2012 |
| 1 | 7 | 5/8/2012 |
| 1 | 8 | 5/16/2012 |
| 1 | 3 | 4/20/2012 |

| Sample 1 |
|---|
| AchievementId |
| 1 |
| 3 |
| 5 |
| 6 |
| 7 |
| 8 |

| EarnedAchievement | | |
|---|---|---|
| GamerId | AchievementId | DateEarned |
| 2 | 5 | 3/1/2012 |
| 2 | 7 | 4/15/2012 |
| 2 | 8 | 4/16/2012 |
| 2 | 3 | 1/15/2012 |
| 2 | 2 | 1/14/2012 |
| 2 | 4 | 2/27/2012 |
| 2 | 1 | 12/22/2011 |
| 2 | 6 | 3/14/2012 |

| Sample 2 |
|---|
| AchievementId |
| 1 |
| 2 |
| 3 |
| 4 |
| 5 |
| 6 |
| 7 |
| 8 |

| EarnedAchievement | | |
|---|---|---|
| GamerId | AchievementId | DateEarned |
| 3 | 3 | 2/1/2012 |
| 3 | 5 | 2/14/2012 |
| 3 | 1 | 1/12/2012 |
| 3 | 2 | 1/13/2012 |

| Sample 3 |
|---|
| AchievementId |
| 1 |
| 2 |
| 3 |
| 5 |

FIGURE 4

| AchievementFrequency | |
|---|---|
| PK | AchievementId |
| | Count |

FIGURE 5B

| AchievementFrequency | |
|---|---|
| AchievementId | Count |
| 1 | 3 |
| 2 | 2 |
| 3 | 3 |
| 4 | 1 |
| 5 | 2 |
| 6 | 1 |
| 7 | 1 |
| 8 | 1 |

FIGURE 5C

| OrderedAchievementFrequency | |
|---|---|
| PK | Order |
| PK | AchievementId |
| | Count |

FIGURE 6B

| OrderedAchievementFrequency | | |
|---|---|---|
| Order | AchievementId | Count |
| 1 | 1 | 3 |
| 2 | 2 | 2 |
| 2 | 3 | 1 |
| 3 | 3 | 2 |
| 3 | 5 | 1 |
| 4 | 4 | 1 |
| 4 | 5 | 1 |
| 4 | 6 | 1 |
| 5 | 5 | 1 |
| 5 | 7 | 1 |
| 6 | 6 | 1 |
| 6 | 8 | 1 |
| 7 | 7 | 1 |
| 8 | 8 | 1 |

FIGURE 6C

| AchievementIndexEntry ||
|---|---|
| PK | AchievementId |
| | GamerId <br> LastOnline |

SYSTEMS AND METHODS FOR IMPLEMENTING ACHIEVEMENT GUIDED RECOMMENDATIONS

CROSS REFERENCE TO RELATED APPLICATION(S)

This application claims the benefit of U.S. Provisional Application No. 61/691,042, filed on Aug. 20, 2012, which is incorporated herein by reference in its entirety.

BACKGROUND OF THE INVENTION

Field of the Invention

The present invention is directed generally to methods of using achievement information, which may be obtained from or generated by electronic games, electronic products, and/or electronic services, to make recommendations to users.

Description of the Related Art

A major component of modern gaming is earning achievements. Achievements, in addition to being fun, have significant unrealized applications. Therefore, a need exists for methods and systems that use achievements as source information. The present application provides these and other advantages as will be apparent from the following detailed description and accompanying figures.

SUMMARY OF INVENTION

Aspects of the present application describe computer-implemented methods each performed by at least one computing device. A first method is for use with data identifying a plurality of users and a plurality of achievements. The data further identifies which of the plurality of achievements each of the plurality of users has earned. The first method includes determining how many of the plurality of users earned each of the plurality of achievements, and generating an ordered achievement list by ordering the plurality of achievements based on how many of the plurality of users earned each of the plurality of achievements. Optionally, the method may include displaying the ordered achievement list and/or removing from the ordered achievement list any of the plurality of achievements identified in the data as having been earned by a selected one of the plurality of users.

A second method is for use with data identifying a plurality of users and a plurality of achievements. The data further identifies which of the plurality of achievements each of the plurality of users has earned and an order in which any such achievements were earned. The second method includes for each of the plurality of users, assigning an order value to each achievement earned by the user indicating the order in which the achievement was earned relative to any other achievements earned by the user. The second method also includes for each unique order value, (a) for at least a portion of the plurality of users, identifying which of the plurality of achievements were assigned the order value to define a set of identified achievements, each identified achievement in the set having a cumulative count value, (b) for the portion of the plurality of users, modifying the cumulative count value for each of any of the identified achievements in the set based on a number of times the identified achievement was assigned the order value, (c) selecting the identified achievement in the set having a largest cumulative count value, and (d) adding the selected identified achievement to an ordered achievement list in a position corresponding to the order value. Optionally, the second method may include displaying the ordered achievement list and/or removing from the ordered achievement list any of the plurality of achievements identified in the data as having been earned by a selected one of the plurality of users.

A third method is for use with data identifying a plurality of users and a plurality of achievements. The data further identifies which of the plurality of achievements each of the plurality of users has earned and an order in which any such achievements were earned. The third method includes constructing a data structure storing a plurality of vertices and a plurality of edges. Each vertex represents a different one of the plurality of achievements, and each edge represents a connection between a different first one of the plurality of vertices and a different second one of the plurality of vertices. The connection indicates the achievement represented by the second vertex was earned after the achievement represented by the first vertex. The third method further includes associating a weight with each of the plurality of edges based on a number of times the achievement represented by the second vertex was earned immediately after the achievement represented by the first vertex according to the order identified by the data for each of the plurality of users, and generating an ordered achievement list based at least in part on the weight associated with each of at least a portion of the plurality of edges. Optionally, the data structure stores at least one table comprising the plurality of vertices and the plurality of edges.

Optionally, the third method includes removing from the ordered achievement list any of the plurality of achievements identified in the data as having been earned by a selected one of the plurality of users.

Optionally, the third method includes displaying the ordered achievement list.

Optionally, the data structure stores a graph comprising the plurality of vertices and the plurality of edges, and determining the ordered achievement list includes identifying a path along the portion of the plurality of edges that visits at least a portion of the achievements, the order in which the portion of achievements are visited defining the ordered achievement list. Optionally, the path has a start, and identifying the path includes identifying a current vertex. The achievement represented by the current vertex was earned before at least one other of the plurality of achievements, and has a connection represented by at least one of the plurality of edges to the at least one other of the plurality of achievements. Identifying the path further includes adding the achievement represented by the current vertex to the path at the start, identifying a set comprising at least one of the plurality of vertices connected to the current vertex representing an achievement that was earned after the achievement represented by the current vertex, associating each vertex in the set with a cumulative weight value determined as a function of the weight associated with the edge connecting the vertex to the current vertex, selecting a next vertex from the set based on the cumulative weight value associated with each vertex in the set, adding the achievement represented by the next vertex to the path after the achievement represented by the current vertex, replacing the current vertex with the next vertex, and after the current vertex is replaced, repeating the identification of the set, the association of each vertex in the set with a cumulative weight value, the selection of the next vertex, addition of the achievement represented by the next vertex to the path, and the replacement of the current vertex until the achievement represented by the current vertex was not earned before at least one other of the plurality of achievements. Optionally, the third method includes removing the next vertex from the set. Optionally, when the identification of the set is repeated, if a particular one of the at least one of the plurality of vertices connected to the current vertex representing an achievement that was earned after the achievement represented by the current vertex is already a member of the set, the weight associated with the edge connecting the particular vertex to the current vertex is added to the cumulative weight value associated with the particular vertex. Optionally, the path has an end, and if after the current vertex is replaced, the achievement represented by the current vertex was not earned before any other of the plurality of achievements, and one or more of the plurality of achievements has not been added to the path, identifying the path further includes adding the one or more of the plurality of achievements to the path at the end.

Optionally, identifying the path further includes before each selection of the next vertex, performing a unification process. The unification process may include excluding from the selection any of the plurality of achievements earned after the achievement represented the current vertex that are (1) connected to the achievement represented by the current vertex, and (2) connected to any other of the plurality of achievements earned after the achievement represented by the current vertex that are also connected to the current vertex.

Optionally, the third method includes before each selection of the next vertex, excluding from the selection each of the plurality of vertices that (1) represents an achievement earned after the achievement represented by the current vertex, and (2) has a connection with the current vertex represented by one of the plurality of edges associated with a weight below a threshold value. Optionally, the threshold value is calculated as a function of the weight associated with each of the plurality of edges representing a connection between the current vertex and any other of the plurality of vertices that represents an achievement earned after the achievement represented by the current vertex. Optionally, the threshold value is a product of a scalar value and an average weight associated with each of the plurality of edges representing a connection between the current vertex and any other of the plurality of vertices that represents an achievement earned after the achievement represented by the current vertex. Optionally, the scalar value is 0.05.

A fourth method is for use with data identifying a plurality of users and a plurality of achievements. The data further identifies which of the plurality of achievements each of the plurality of users has earned and when any such achievements were earned. The fourth method includes ordering the plurality of achievements to define an ordered achievement list. For a selected one of the plurality of users, any of the plurality of achievements identified in the data as having been earned by the selected user are removed from the ordered achievement list to define a recommended achievement list. For each recommended achievement of at least a first portion of the recommended achievement list, the fourth method includes identifying one or more of the plurality of users identified in the data as having earned the recommended achievement.

Optionally, the fourth method includes displaying information identifying the identified one or more of the plurality of users to the selected user. Optionally, the fourth method includes before identifying the one or more of the plurality of users, associating a parent achievement with each recommended achievement of at least a second portion of the recommended achievement list, and removing any recommended achievement from the recommended achievement list associated with a parent achievement that the data does not indicate was earned by the selected user. An identification of the selected user may be received via a user input device.

Optionally, ordering the plurality of achievements to define the ordered achievement list may include determining how many of the plurality of users earned each of the plurality of achievements, and ordering the plurality of achievements based on how many of the plurality of users earned each of the plurality of achievements.

Optionally, ordering the plurality of achievements to define the ordered achievement list may include for each of the plurality of users, assigning an order value to each achievement earned by the user indicating an order in which the achievement was earned relative to when any other achievements were earned by the user, and for each unique order value (a) for at least a portion of the plurality of users, identifying which of the plurality of achievements were assigned the order value to define a set of identified achievements, each identified achievement in the set having a cumulative count value, (b) for the portion of the plurality of users, modifying the cumulative count value for each of any of the identified achievements in the set based on a number of times the identified achievement was assigned the order value, (c) selecting the identified achievement in the set having a largest cumulative count value, and (d) adding the selected identified achievement to the ordered achievement list in a position corresponding to the order value.

Optionally, ordering the plurality of achievements to define the ordered achievement list includes constructing a data structure storing a plurality of vertices and a plurality of edges. Each vertex represents a different one of the plurality of achievements, and each edge represents a connection between a different first one of the plurality of vertices and a different second one of the plurality of vertices. The connection indicates the achievement represented by the second vertex was earned after the achievement represented by the first vertex. ordering the plurality of achievements to define the ordered achievement list may further include associating a weight with each of the plurality of edges based on a number of times the achievement represented by the second vertex was earned immediately after the achievement represented by the first vertex according to the order identified by the data for each of the plurality of users, and generating the ordered achievement list based at least in part on the weight associated with each of at least a portion of the plurality of edges. Optionally, the data structure stores at least one table comprising the plurality of vertices and the plurality of edges. Optionally, the data structure stores a graph comprising the plurality of vertices and the plurality of edges, and ordering the plurality of achievements to define the ordered achievement list further includes identifying a path along the portion of the plurality of edges that visits at least a portion of the achievements. The order in which the portion of achievements are visited defines the ordered achievement list. Optionally, the path has a start, and identifying the path includes identifying a current vertex. The achievement represented by the current vertex was earned before at least one other of the plurality of achievements, and has a connection represented by at least one of the plurality of edges to the at least one other of the plurality of achievements. Optionally, identifying the path further includes adding the achievement represented by the current vertex to the path at the start, identifying a set comprising at least one of the plurality of vertices connected to the current vertex representing an achievement that was earned after the achievement represented by the current vertex, associating each vertex in the set with a cumulative weight value determined as a function of the weight associated with the edge connecting the vertex to the current vertex, selecting a next vertex from the set based on the cumulative weight value associated with each vertex in the set, adding the achievement represented by the next vertex to the path after the achievement represented by the current vertex, replacing the current vertex with the next vertex, and after the current vertex is replaced, repeating the identification of the set, the association of each vertex in the set with a cumulative weight value, the selection of the next vertex, addition of the achievement represented by the next vertex to the path, and the replacement of the current vertex until the achievement represented by the current vertex was not earned before at least one other of the plurality of achievements. Optionally, the next vertex is removed from the set. Optionally, when the identification of the set is repeated, if a particular one of the at least one of the plurality of vertices connected to the current vertex representing an achievement that was earned after the achievement represented by the current vertex is already a member of the set, the weight associated with the edge connecting the particular vertex to the current vertex is added to the cumulative weight value associated with the particular vertex. Optionally, the path has an end, and identifying the path further includes if after the current vertex is replaced, the achievement represented by the current vertex was not earned before any other of the plurality of achievements, and one or more of the plurality of achievements has not been added to the path, adding the one or more of the plurality of achievements to the path at the end. Optionally, identifying the path further includes before each selection of the next vertex, performing a unification process that excludes from the selection any of the plurality of achievements earned after the achievement represented by the current vertex that are (1) connected to the achievement represented by the current vertex, and (2) connected to any other of the plurality of achievements earned after the achievement represented by the current vertex that are also connected to the current vertex.

Optionally, before each selection of the next vertex, each of the plurality of vertices is excluded from the selection that (1) represents an achievement earned after the achievement represented by the current vertex, and (2) has a connection with the current vertex represented by one of the plurality of edges associated with a weight below a threshold value. Optionally, the threshold value is calculated as a function of the weight associated with each of the plurality of edges representing a connection between the current vertex and any other of the plurality of vertices that represents an achievement earned after the achievement represented by the current vertex. Optionally, the threshold value is a product of a scalar value and an average weight associated with each of the plurality of edges representing a connection between the current vertex and any other of the plurality of vertices that represents an achievement earned after the achievement represented by the current vertex. Optionally, the scalar value is 0.05.

A fifth method is for use with data identifying a plurality of titles and a plurality of users. The data further identifies a plurality of achievements associated with each of the plurality of titles. For each title, the data indicates which of the plurality of achievements each of the plurality of users has earned and when any such achievements were earned. The fifth method includes selecting one of the plurality of users, and ignoring any of the plurality of titles for which the data indicates the selected user has earned all of the plurality of achievements associated with the title. Each title not being ignored is associated with a score. The fifth method further includes assigning a maximum value to the score associated with the title that was last played by the user that is not being ignored, and for each title that is not being ignored, (a) ordering the plurality of achievements to define an ordered achievement list, (b) for the selected user, removing from the ordered achievement list any of the plurality of achievements identified in the data as having been earned by the selected user to define a recommended achievement list, and (c) for each recommended achievement in at least a portion of the recommended achievement list, (i) determining a completion factor based at least in part on a number of the plurality of users the data indicates have earned the recommended achievement, and a number of the plurality of users the data indicates have earned at least one achievement associated with the title associated with the recommended achievement, (ii) determining a weight based at least in part on a position of the recommended achievement in the recommended achievement list, and (iii) modifying the score associated with the title that is associated with the recommended achievement based at least in part on the completion factor and the weight. The fifth method also includes recommending at least one of the titles not being ignored based on the score associated with the at least one of the titles. Optionally, the at least one recommended title may be displayed to the selected user.

A sixth method is for use with data identifying a plurality of users and a plurality of achievements. The data further identifies which of the plurality of achievements each of the plurality of users has earned and an order in which any such achievements were earned. The sixth method includes constructing a data structure storing a plurality of vertices and a plurality of edges. Each vertex represents a different one of the plurality of achievements, and each edge represents a connection between a different first one of the plurality of vertices and a different second one of the plurality of vertices. The connection indicates the achievement represented by the second vertex was earned after the achievement represented by the first vertex. The sixth method further includes associating a weight with each of the plurality of edges based on a number of times the achievement represented by the second vertex was earned immediately after the achievement represented by the first vertex according to the order identified by the data for each of the plurality of users, and identifying a current vertex. The achievement represented by the current vertex was earned before at least one other of the plurality of achievements, and has a connection represented by at least one of the plurality of edges to the at least one other of the plurality of achievements. The sixth method further includes adding to a child set any of the plurality of vertices that (i) was not added previously to the child set, (ii) is connected to the current vertex, and (iii) represents an achievement that was earned after the achievement represented by the current vertex. The sixth method further includes associating each vertex in the child set with a cumulative weight value determined as a function of the weight associated with the edge connecting the vertex to the current vertex, adding to a parent set as a child vertex any vertex added to the child set. Each child vertex added to the parent set is associated with a parent vertex that is the current vertex, and a parent weight that is the weight associated with the edge connecting the vertex to the current vertex. The sixth method further includes selecting a next vertex from the child set based on the cumulative weight value associated with each vertex in the child set, replacing the current vertex with the next vertex, and after the current vertex is replaced, repeating the addition to the child set, the association of each vertex in the child set with a cumulative weight value, the addition to the parent set as a child vertex any vertex added to the child set, the selection of the next vertex, and the replacement of the current vertex until the achievement represented by the current vertex was not earned before at least one other of the plurality of achievements. The sixth method further includes for each of the plurality of achievements, adding the achievement to a list if the data indicates a selected user has not earned the achievement, and the parent set indicates the achievement is represented by a child vertex associated with a parent vertex that the data indicates the selected user has earned. Optionally, after the replacement of the current vertex with the next vertex, the previous current vertex may be excluded from the repeating.

Optionally, the sixth method further includes for each of the plurality of vertices added previously to the child set, connected to the current vertex, and representing an achievement that was earned after the achievement represented by the current vertex (a) modifying the cumulative weight value associated with the vertex by adding thereto the weight associated with the edge connecting the vertex to the current vertex, and (b) if the parent weight associated with the vertex is less than the weight associated with the edge connecting the vertex to the current vertex, associating the vertex with the current vertex as the parent vertex, and associating the weight associated with the edge connecting the vertex to the current vertex as the parent weight.

Optionally, the sixth method includes displaying the list to the selected user.

Optionally, the sixth method includes before each selection of the next vertex, performing a unification process that excludes from the selection any of the plurality of achievements earned after the achievement represented by the current vertex that are (1) connected to the achievement represented by the current vertex, and (2) connected to any other of the plurality of achievements earned after the achievement represented by the current vertex that are also connected to the current vertex.

A seventh method is for use with data identifying a particular user of a plurality of users, a title, and a plurality of achievements that may be earned with respect to the title. The data further identifies which of the plurality of achievements the particular user has earned. The seventh method includes determining an achievement difficulty value for each of the plurality of achievements, determining a title interest contribution value for each of the plurality of achievements as a function of the achievement difficulty value determined for the achievement, identifying one or more of the plurality of achievements that were earned by the particular user, and determining a user interest value as a function of the title interest contribution value determined for each of the identified one or more of the plurality of achievements that were earned by the particular user. The user interest value indicates a level of interest of the particular user with respect to the title.

Optionally, the data identifies a total number of the plurality of users who have earned each of the plurality of achievements, and the achievement difficulty value is determined for each of the plurality of achievements as a function of the total number of the plurality of users who have earned the achievement and a total number of the plurality of users who have played the title.

Optionally, the data identifies a total number of the plurality of users who have earned each of the plurality of achievements, and the achievement difficulty value is determined for each of the plurality of achievements by dividing the total number of the plurality of users who have earned the achievement by the total number of the plurality of users who have played the title.

Optionally, the title interest contribution value is determined for each of the plurality of achievements by subtracting the achievement difficulty value determined for the achievement from one.

Optionally, the user interest value is determined by summing the title interest contribution value determined for each of the identified one or more of the plurality of achievements that were earned by the particular user.

Optionally, the seventh method includes determining a total achievement interest value as a function of the title interest contribution value determined for each of the plurality of achievements, and determining a user title interest value as a function of the user interest value and the total achievement interest value. Optionally, the total achievement interest value is determined by summing the title interest contribution value determined for each of the plurality of achievements. Optionally, the user title interest value is determined by dividing the user interest value by the total achievement interest value.

Optionally, the title is a first title, and the data further identifies a second title associated with a second user title interest value for the particular user, the user title interest value determined for the first title is a first user title interest value, and the seventh method includes (1) determining which of the first and second titles the user prefers by comparing the first and second user title interest values, and (2) displaying identifications of the first and second titles, the display indicating which of the first and second titles the particular user prefers.

Optionally, the particular user is a first user, and the data further identifies a second user associated with a second user title interest value for the title, the user title interest value determined for the title and the first user is a first user title interest value, and the seventh method further includes (1) determining whether the second user matches the first user by comparing the first and second user title interest values, and (2) if it is determined that the second user matches the first user, displaying an identification of the second user to the first user. Optionally, the second user matches the first user when the second user title interest value is closest to the first user title interest value.

Optionally, the at least one computing device is operated by an entity. A logically separate system is connected to at least one computing device by a network and/or an interface. The logically separate system may be operated by an external service provider other than the entity. The seventh method further includes forwarding the user interest value over the network and/or the interface to the logically separate system for use thereby.

An eighth method is for use with data identifying a plurality of users and a plurality of achievements. The data further identifies which of the plurality of achievements each of the plurality of users has earned and when any such achievements were earned. The eighth method includes ordering the plurality of achievements to define an ordered achievement list. For each of the plurality of users, any of the plurality of achievements identified in the data as having been earned by the user are removed from the ordered achievement list to define a recommended achievement list for the user. The eighth method also includes identifying a selected achievement, and identifying as a set of similar users any of the plurality of users whose recommended achievement list includes the selected achievement. Optionally, the eighth method includes displaying information identifying the set of similar users. Optionally, before identifying the set of similar users, and for each of the plurality of users, a parent achievement is associated with each achievement of at least a portion of the user's recommended achievement list, and the eighth method includes removing any achievement from the user's recommended achievement list associated with a parent achievement that the data does not indicate was earned by the user.

Optionally, identifying the selected achievement includes receiving an identification of a selected user via a user input device, and selecting an achievement from the selected user's recommended achievement list. Optionally, identifying the selected achievement comprises receiving an identification of the selected achievement via a user input device.

Optionally, ordering the plurality of achievements to define the ordered achievement list includes determining how many of the plurality of users earned each of the plurality of achievements, and ordering the plurality of achievements based on how many of the plurality of users earned each of the plurality of achievements.

Optionally, ordering the plurality of achievements to define the ordered achievement list may include for each of the plurality of users, assigning an order value to each achievement earned by the user indicating an order in which the achievement was earned relative to when any other achievements were earned by the user, and for each unique order value (a) for at least a portion of the plurality of users, identifying which of the plurality of achievements were assigned the order value to define a set of identified achievements, each identified achievement in the set having a cumulative count value, (b) for the portion of the plurality of users, modifying the cumulative count value for each of any of the identified achievements in the set based on a number of times the identified achievement was assigned the order value, (c) selecting the identified achievement in the set having a largest cumulative count value, and (d) adding the selected identified achievement to the ordered achievement list in a position corresponding to the order value.

Optionally, ordering the plurality of achievements to define the ordered achievement list includes constructing a data structure storing a plurality of vertices and a plurality of edges. Each vertex represents a different one of the plurality of achievements, and each edge represents a connection between a different first one of the plurality of vertices and a different second one of the plurality of vertices. The connection indicates the achievement represented by the second vertex was earned after the achievement represented by the first vertex. ordering the plurality of achievements to define the ordered achievement list may further include associating a weight with each of the plurality of edges based on a number of times the achievement represented by the second vertex was earned immediately after the achievement represented by the first vertex according to the order identified by the data for each of the plurality of users, and generating the ordered achievement list based at least in part on the weight associated with each of at least a portion of the plurality of edges. Optionally, the data structure stores at least one table comprising the plurality of vertices and the plurality of edges. Optionally, the data structure stores a graph comprising the plurality of vertices and the plurality of edges, and ordering the plurality of achievements to define the ordered achievement list further includes identifying a path along the portion of the plurality of edges that visits at least a portion of the achievements. The order in which the portion of achievements are visited defines the ordered achievement list. Optionally, the path has a start, and identifying the path includes identifying a current vertex.

The achievement represented by the current vertex was earned before at least one other of the plurality of achievements, and has a connection represented by at least one of the plurality of edges to the at least one other of the plurality of achievements. Optionally, identifying the path further includes adding the achievement represented by the current vertex to the path at the start, identifying a set comprising at least one of the plurality of vertices connected to the current vertex representing an achievement that was earned after the achievement represented by the current vertex, associating each vertex in the set with a cumulative weight value determined as a function of the weight associated with the edge connecting the vertex to the current vertex, selecting a next vertex from the set based on the cumulative weight value associated with each vertex in the set, adding the achievement represented by the next vertex to the path after the achievement represented by the current vertex, replacing the current vertex with the next vertex, and after the current vertex is replaced, repeating the identification of the set, the association of each vertex in the set with a cumulative weight value, the selection of the next vertex, addition of the achievement represented by the next vertex to the path, and the replacement of the current vertex until the achievement represented by the current vertex was not earned before at least one other of the plurality of achievements. Optionally, the next vertex is removed from the set. Optionally, when the identification of the set is repeated, if a particular one of the at least one of the plurality of vertices connected to the current vertex representing an achievement that was earned after the achievement represented by the current vertex is already a member of the set, the weight associated with the edge connecting the particular vertex to the current vertex is added to the cumulative weight value associated with the particular vertex. Optionally, the path has an end, and identifying the path further includes if after the current vertex is replaced, the achievement represented by the current vertex was not earned before any other of the plurality of achievements, and one or more of the plurality of achievements has not been added to the path, adding the one or more of the plurality of achievements to the path at the end. Optionally, identifying the path further includes before each selection of the next vertex, performing a unification process that excludes from the selection any of the plurality of achievements earned after the achievement represented by the current vertex that are (1) connected to the achievement represented by the current vertex, and (2) connected to any other of the plurality of achievements earned after the achievement represented by the current vertex that are also connected to the current vertex.

Optionally, before each selection of the next vertex, each of the plurality of vertices is excluded from the selection that (1) represents an achievement earned after the achievement represented by the current vertex, and (2) has a connection with the current vertex represented by one of the plurality of edges associated with a weight below a threshold value. Optionally, the threshold value is calculated as a function of the weight associated with each of the plurality of edges representing a connection between the current vertex and any other of the plurality of vertices that represents an achievement earned after the achievement represented by the current vertex. Optionally, the threshold value is a product of a scalar value and an average weight associated with each of the plurality of edges representing a connection between the current vertex and any other of the plurality of vertices that represents an achievement earned after the achievement represented by the current vertex. Optionally, the scalar value is 0.05.

Aspects of the present application describe a system that includes one or more computing devices configured to perform one or more of the first, second, third, fourth, fifth, sixth, seventh, and eighth methods described above.

Aspects of the present application describe at least one non-transitory computer-readable medium comprising instructions that when executed by one or more processors causes the one or more processors to perform one or more of the first, second, third, fourth, fifth, sixth, seventh, and eighth methods described above.

BRIEF DESCRIPTION OF THE SEVERAL VIEWS OF THE DRAWING(S)

FIG. 4 depicts the raw real world data of FIG. 3 converted into a set of samples.

FIG. 5B illustrates an AchievementFrequency table that may be used by the first method of FIG. 5A.

FIG. 5C illustrates data stored in the AchievementFrequency table of FIG. 5B when the first method of FIG. 5A is performed with respect to the example raw real world achievement data illustrated in FIG. 3.

FIG. 6B illustrates an OrderedAchievementFrequency table that may be used by the second method of FIG. 6A.

FIG. 6C illustrates data stored in the OrderedAchievementFrequency table of FIG. 6B when the second method of FIG. 6A is performed with respect to the example raw real world achievement data illustrated in FIG. 3.

DETAILED DESCRIPTION OF THE INVENTION

Systems for and methods are described below that make recommendations guided by or based at least in part on achievements (also known as trophies or badges) that may be earned in or otherwise obtained from electronic games, electronic products, and/or electronic services (referred to collectively as "titles"). By way of non-limiting examples, electronic games include video games, online games, contests, and the like. Examples of electronic products include gambling machines, pedometers, time card machines, and the like. Examples of electronic services include online forums, blogs, ecommerce sites, and the like.

Achievements include any sort of award or recognition that may be associated with a particular user. When a particular achievement is associated with a particular user, the user is referred to as having "earned" the achievement.

Users are referred to herein as "gamers." However, as explained above, achievements are not necessarily earned only in electronic games and may instead be earned in electronic products and/or electronic services that are not electronic games. Thus, the term "gamer" is used herein to describe users who have earned or not earned achievements.

In some of the methods described below, achievements (earned and/or unearned) by gamers are used as criteria for making recommendations. For example, achievements may be used to classify gamers, identify gamer preferences, and/or match gamers.

With respect to gamer classification, achievements may be used to classify gamers according to "type." By way of a non-limiting example, types of gamers may include "hardcore" and "casual." Gamers who earn more difficult to obtain achievements are more likely to be "hardcore" gamers (and thus, may be categorized as "hardcore") when compared to gamers who have not earned the easiest achievements. The latter group of gamers may be categorized as "casual" gamers.

Further, achievements may be used to identify gamer preferences and/or interests. Gamers who earn harder achievements in a first type of games but not in other types of games may be thought of as preferring or having more interest in the first type of games. This information may be used to make recommendations and implement matchmaking.

With respect to gamer matchmaking, gamers may be matched based on gamer characteristics identified by an achievement analysis, such as play style (hardcore, casual, etc.), preferences (similar games favored), and intent (achievements the gamers need to earn and/or have already earned).

Figure 1:
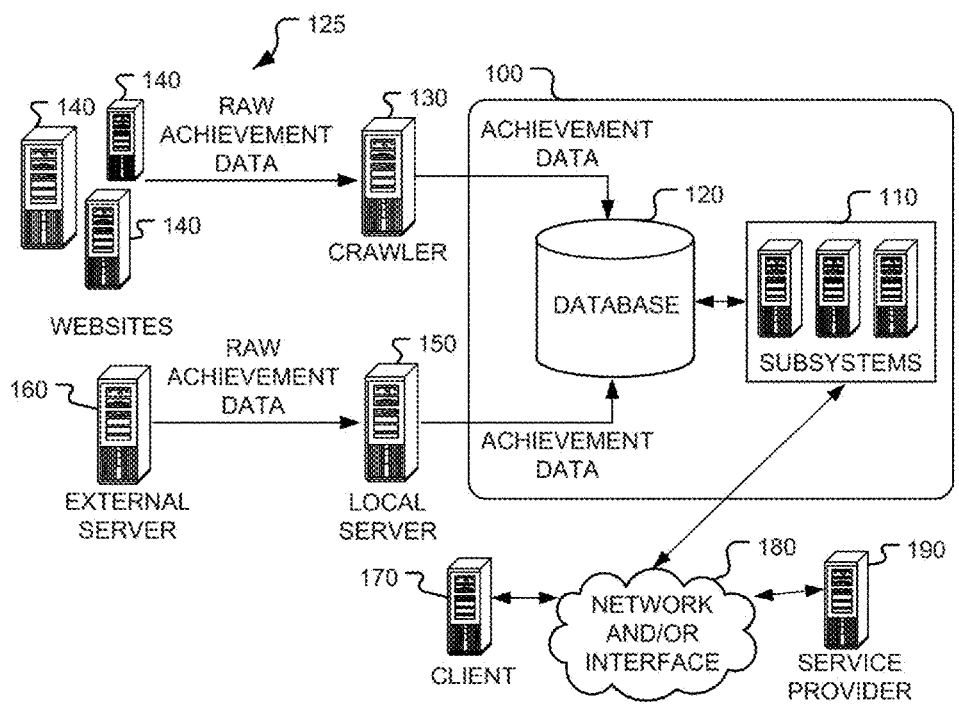
FIG. 1 is a diagram of an achievement guided recommendation system.

Referring to FIG. 1, an achievement guided recommendation system 100 may be configured to solve a first problem: "given a particular gamer, find similar gamers." When solving the first problem, the system may also solve a second problem: "given a set of titles and achievements (i.e. titles and achievements associated with the particular gamer), find other gamers who share the most needed-achievements by the particular gamer." Solving the latter problem helps find gamers similar to the particular gamer because "most-needed" achievements are indicative of 1) earned and unearned achievements and 2) gamer interest and compatibility due to the difficulty and type of achievements. The system 100 has applications including but not limited to finding and/or displaying which gamers are similar to a particular gamer, and/or finding and/or displaying which gamers need the same achievements as a particular gamer. To do this, the system 100 may be configured to do the following:

1. Compute a set of "most-needed achievements" from a set of titles and achievements for each of the gamers (e.g., the titles played and achievements earned by the gamer);
2. Identify a specific gamer;
3. Optionally, identify a search list of achievements;
4. If a search list of achievements has not been identified, identify the "most-needed achievements" of the specific gamer as the search list of achievements;
5. Find a set of matching gamers wherein each gamer's set of most "most-needed achievements" match (e.g., are identical or substantially similar to) the search list of achievements; and
6. Optionally, apply any relevant secondary criteria (currently online, similar skill, etc.) to the set of matching gamers.

The system 100 may be configured to solve a third problem: "given a title and an optional gamer, find the most-needed achievements." Solving this problem may help solve the first problem above. Solutions to the third problem may be used to find and/or display which achievements are most-needed for a title and an optional gamer. This is particularly useful when a user may not know which achievements should be earned next. To solve the third problem, the system 100 may be configured to do the following:

1. Determine the achievement order dependencies for a title; and
2. From the achievement order dependencies, determine which unearned achievements should be earned next given a set of already earned achievements.

The system 100 may be configured to solve a fourth problem: "given a title and an optional gamer, find the recommended order achievements should be earned." Solving the fourth problem may help solve the problems discussed above. Solutions to the fourth problem may be used to display a recommended achievement order for a title and an optional gamer. To solve the fourth problem, the system 100 may be configured to do the following:

1. Determine the achievement order dependencies for a title; and
2. From the achievement order dependencies, determine the order in which all unearned achievements should be earned given a set of already earned achievements.

The system 100 may be configured to solve a fifth problem: "given a gamer, find a recommended title order." Solutions to this problem may be used to find and/or display which titles a gamer should play next, and are particularly useful when a gamer may not know which titles may be the most interesting and/or provide the most potential achievement benefit. To solve the fifth problem, the system 100 may be configured to do the following:

1. Determine the interest and potential achievement benefit of a title with respect to a gamer; and
2. Sort titles by interest and potential achievement benefit with respect to a gamer.

The system 100 may be configured to solve a sixth problem: "given a particular gamer, determine a quantitative measure of interest." Solutions to this problem may be used to identify (and/or display) the type of gamer (hardcore, casual, etc.), identify (and/or display) recommended titles, and/or determine (and/or display) potential marketability of a title toward a particular gamer. To solve the sixth problem, the system 100 may be configured to compute gamer interest levels in titles based on achievements.

The system 100 may include one or more of the following components:

1. means for acquiring, storing, and retrieving gamer and title achievement data;
2. means for determining achievement order dependencies;
3. means for storing and retrieving achievement order dependencies;
4. means for recommending an achievement order;
5. means for determining most-needed achievements;
6. means for storing and retrieving which gamers most-need an achievement;
7. means for determining which gamers have the most most-needed achievements; and
8. means for determining gamer interest in a title.

The system 100 may include one or more of the following components:

1. means for determining which titles a gamer is most likely to be interested in, considering which titles have the most relevant remaining achievements;
2. if a gamer is specified, means for retrieving and displaying:
   a. a recommended title order,
   b. a recommended achievement order, and/or
   c. a set of gamers that most need each achievement;
3. if a title is specified, means for retrieving and displaying:
   a. a recommended achievement order, and/or
   b. a set of gamers that most need each achievement;
4. if a gamer and title are specified, means for retrieving and displaying:
   a. a recommended achievement order excluding achievements already earned by the gamer, and/or
   b. a set of gamers that most need each achievement; and
5. if an achievement is specified, means for retrieving and displaying a set of gamers that most need each achievement.

Implementation

Acquiring, Storing, and Retrieving Raw Gamer and Title Achievement Data

FIG. 1 is a high-level diagram of the system 100 configured to perform the methods described in this application. In FIG. 1, the system 100 may include any number of subsystems 110 that perform the methods described in this application, and may be specifically implemented by one or more computing devices described below with respect to FIG. 15. In some implementations, the one or more computing devices implement a database 120 (e.g., a relational database) connected to the one or more subsystems 110. Optionally, the one or more computing devices may implement one or more data sources 125, such as one or more web servers 140, an external server 160, and the like, connected to the system 100. The data sources may supply data (e.g., user input, achievement data, and the like) to the system 100.

The system 100 may receive data from the data sources 125 via a web crawler 130, a local server 150, and the like connected to the data sources 125 by a network or interface (e.g., a network and/or interface 180). The network and/or interface 180 may include a LAN, a WAN, the Internet, an API, inter-process communication, shared memory, etc. Further, the network and/or interface 180 may include combinations of such components.

The network and/or interface 180 connects the system 100 with one or more logically separate systems, such as one or more client computing devices 170, at least one service provider 190, and the like. At least one of the subsystems 110 may be configured to communicate with the one or more client computing devices 170 and/or the at least one service provider 190 across the network and/or interface 180. For example, at least one of the subsystems 110 may include or be connected to a web server configured to deliver web pages (e.g., a user input page 212 illustrated in FIG. 14B, an output page 242 illustrated in FIG. 14C, and the like) to the one or more client computing devices 170. The web server is further configured to receive input from the one or more client computing devices 170.

The service provider 190 is configured to receive data from the subsystems 110. By way of non-limiting examples, this data may include a total achievement interest value (see block 524 of a method 500 illustrated in FIG. 16) and/or a gamer title interest value (see block 525 of the method 500 illustrated in FIG. 16) determined for each of a plurality of gamers with respect to one or more titles. The service provider 190 may process the data and perform additional functions which may include Business Intelligence (e.g., game and related attribute analysis, user behavioral analysis, market analysis, and the like) and/or Information Filtering also referred to as "Collaborative Filtering" (e.g., recommendations). For example, the service provider 190 may utilize achievement data and/or the gamer title interest values received from subsystem 110 to determine what percentage of gamers have a high interest level in games (e.g., "hardcore" gamers) classified as "shooters" relative to what percentage of gamers have a high interest level in games classified as Role Playing Games ("RPGs").

The system 100 may be operated by an entity (e.g., a company). The service provider 190 may be operated by an entity that is different from the entity operating the system 100. In such embodiments, the service provider 190 may be located remotely from the system 100.

In some embodiments, at least one of the subsystems 110 may be configured to perform the functionality described above as being performed by the service provider 190. In such embodiments, the service provider 190 may be omitted.

Achievement data can be acquired (e.g., crowdsourced) from a variety of sources (e.g., the data sources 125) using well-known techniques (web crawling, database import, manual entry, etc.). While it is theoretically possible to input achievement data manually, in practice billions of achievement data records exist making automatic methods preferred.

Figure 2:
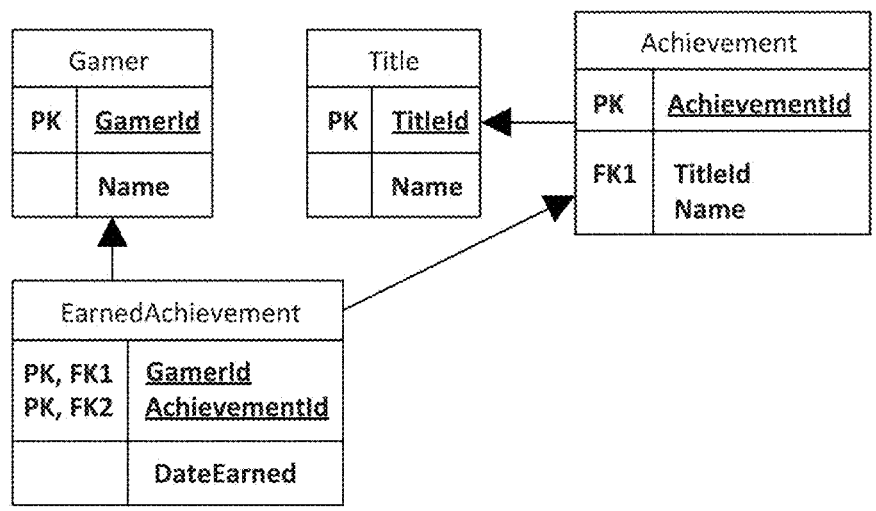
FIG. 2 is an exemplary schema including tables for storing achievement data in a structured format in a database of the system of FIG. 1.

Raw achievement data may be converted to structured form to facilitate processing. FIG. 2 is an example schema for storing achievement data in a structured format. FIG. 2 illustrates four tables: a Gamer table; a Title table, an Achievement table; and an EarnedAchievement table. In FIG. 2, primary keys are identified using the abbreviation "PK," and foreign keys are identified using the abbreviation "FK." These tables may be stored in a database (e.g., the database 120 depicted in FIG. 1).

Figure 3:
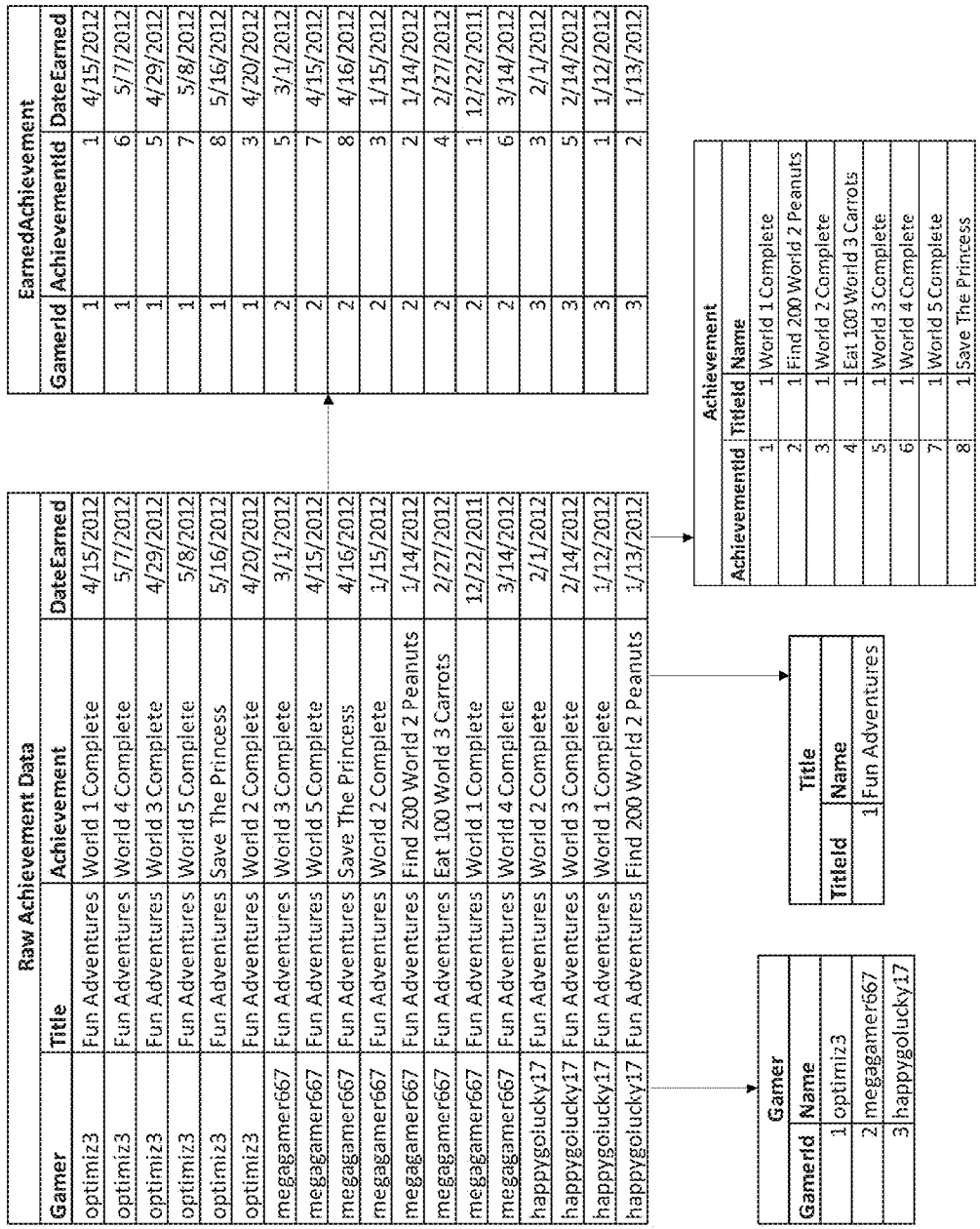
FIG. 3 illustrates example raw real world achievement data stored in a Raw Achievement Data table and the tables illustrated in FIG. 2.

FIG. 3 provides an example of raw real world achievement data stored in a Raw Achievement Data table. FIG. 3 also illustrates how this data is stored in the tables of FIG. 2 (or converted to a structured format). The data of FIG. 3 is provided for explanatory purposes and referred to in the remainder of the application.

Determining Achievement Order Dependencies

To determine the achievement order dependencies for a title, sets of earned achievements for the title may be used that (1) are grouped by gamer, and (2) include the date when an achievement was earned, or a relative order in which the achievements were earned.

Before determining achievement order dependencies, each set of earned achievements is analyzed to determine a sequence of achievements ordered by when the achievements were earned. Each sequence of ordered achievements can be thought of as a sample of a potentially correct achievement order for a title.

FIG. 4 provides an example of the raw real world data of FIG. 3 converted to a set of samples (e.g., Sample 1, Sample 2, and Sample 3).

At this point, several computational methods may be used to determine achievement order. Methods presented below are believed to be ordered from the simplest (and least effective) to more complex (and more effective).

Method 1a: Compute Achievement Frequency

Figure 5A:
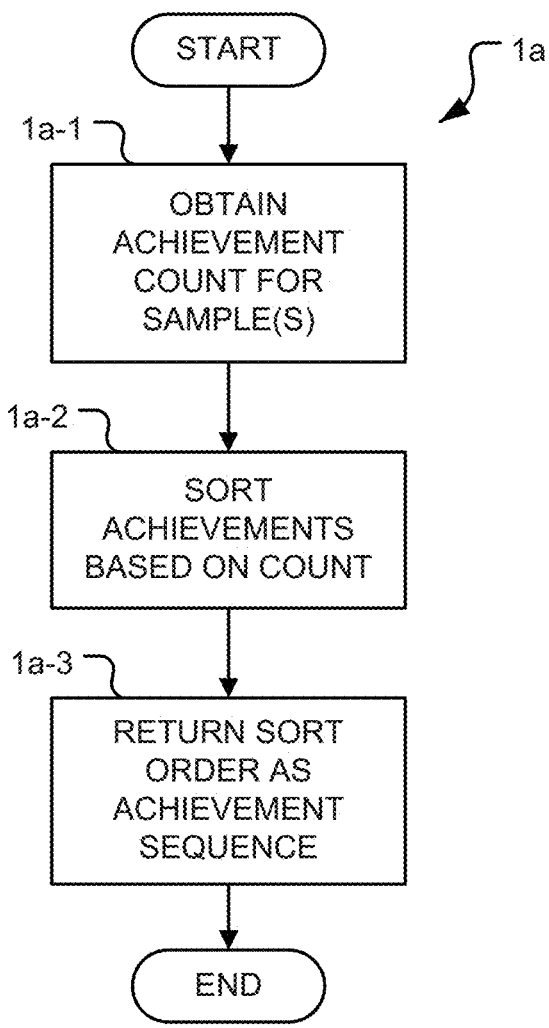
FIG. 5A is a flow diagram of a first method of obtaining an achievement order (or sequence).

FIG. 5A is a flow diagram of the method 1a that may be performed by the system 100. The method 1a may be implemented using a table (e.g., an AchievementFrequency table illustrated in FIG. 5B) organized by {AchievementId, Count}. The table may be stored in the database 120 (see FIG. 1).

In first block 1a-1, for each earned achievement in one or more samples (e.g., Sample 1, Sample 2, and Sample 3 of FIG. 4), the system 100 increments the Count associated with the AchievementId. Thus, in block 1a-1, a count of how many times each achievement was earned in the one or more samples is obtained. For example, the achievement assigned the AchievementId=1 was earned once in each of the three samples, Sample 1, Sample 2, and Sample 3 of FIG. 4. Therefore, in this example, the value of the Count for AchievementId=1 is three. FIG. 5C illustrates expected table data determined based on the example data illustrated in FIG. 3.

Then, in block 1a-2, the system 100 sorts the resulting achievement frequency table in descending order by Count to obtain an AchievementId sequence. In block 1a-3, the system 100 returns the resulting AchievementId sequence as the achievement order. Based on the data above, the returned sequence will be {1, 3, 2, 5, 4, 6, 7, 8}. Then, the method 1a terminates.

There are a few drawbacks to the approach of the method 1a. For example, the method 1a is unable to determine achievement order when achievements have the same or similar achievement counts. Although achievement order (due to achievement earned dates) is known on a per-gamer level, this information is lost using due to the simple counter approach here. Further, the method 1a does not identify or account for achievement dependencies (e.g., various titles may require some achievements to be earned before others).

Method 1b: Compute Order Achievement Frequency

Figure 6A:
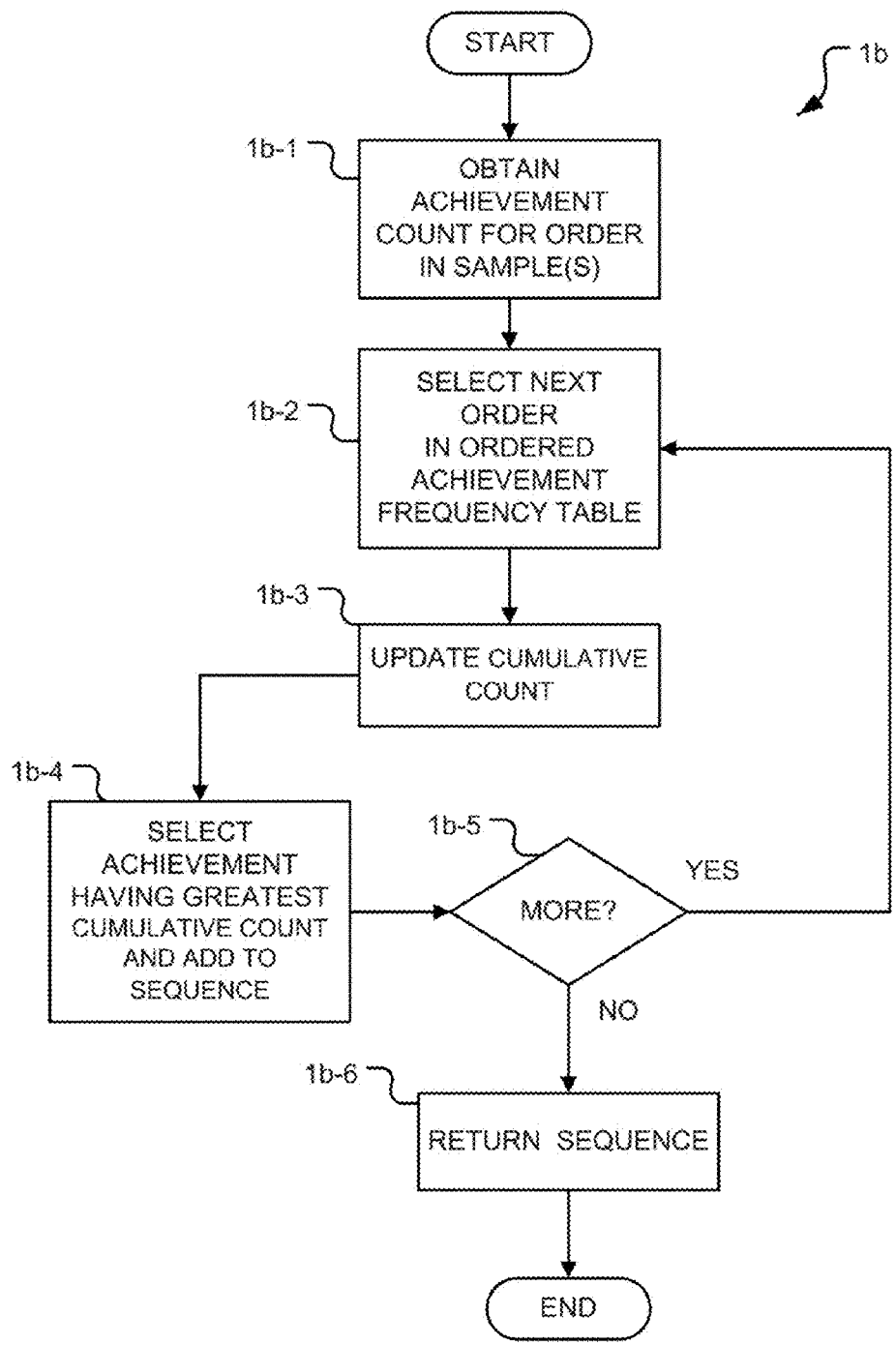
FIG. 6A is a flow diagram of a second method of obtaining an achievement order (or sequence).

FIG. 6A is a flow diagram of the method 1b that may be performed by the system 100. The method 1b may be implemented using a table (e.g., an OrderedAchievementFrequency table illustrated in FIG. 6B) organized by {{Order, AchievementId}, Count}. The table may be stored in the database 120 (see FIG. 1).

In first block 1b-1, for each earned achievement in a sample (e.g., Sample 1, Sample 2, and Sample 3), the system 100 increments the Count associated with the Order (current position in the sample set) and AchievementId. For example, the achievement assigned AchievementId=1 was earned once in each of the three samples, Sample 1, Sample 2, and Sample 3 of FIG. 4. In each of these samples, the achievement assigned AchievementId=1 was earned first. Therefore, in this example, the value of the Count for AchievementId=1 is three for Order=1. On the other hand, the achievement assigned AchievementId=3 was also earned once in each of the three samples. In the Sample 1, the achievement assigned AchievementId=3 was earned second. In the Sample 2, the achievement assigned AchievementId=3 was earned third. In the Sample 3, the achievement assigned AchievementId=3 was earned third. Therefore, in this example, the value of the Count for AchievementId=3 is one for Order=2, and two for Order=3. FIG. 6C illustrates expected table data determined based on the example data illustrated in FIG. 3.

In block 1b-2, the system 100 traverses the ordered achievement frequency table by Order and selects a next order. For example, when the method 1b begins, Order=1 is selected.

In block 1b-3, the system 100 updates a cumulative Count for each AchievementId. For example, for Order=1, the system 100 sets the cumulative count of AchievementId=1 equal to three. The cumulative counts of the other AchievementId values remain unchanged.

In block 1b-4, the system 100 selects the AchievementId having the greatest cumulative count and adds the selected AchievementId to an AchievementId sequence. For Order=1, the achievement assigned AchievementId=1 is selected and added to the AchievementId sequence.

Then, in decision block 1b-5, the system 100 determines whether the ordered achievement frequency table includes additional order values. If the ordered achievement frequency table includes additional order values, the system 100 returns to block 1b-2 to select the next order. On the other hand, if the ordered achievement frequency table does not include any additional order values, the system advances to block 1b-6.

In block 1b-6, the system 100 returns the AchievementId sequence. Then, the method 1b terminates.

Thus, in the method 1b, at each unique order, the system 100 adds the Count associated with each AchievementId to that AchievementId's cumulative Count. Then, the system 100 selects the achievement with the highest cumulative Count, and repeats until all achievements have been selected.

The following is an example of how the data in OrderedAchievementFrequency table illustrated in FIG. 6C would be analyzed using the Method 1b:

For order #1, only AchievementId #1 (cumulative count=3) is present so select AchievementId #1.

For order #2, AchievementId #2 (cumulative count=2) and AchievementId #3 (cumulative count=1) are present. Select AchievementId #2 because it has the larger cumulative count.

For order #3, AchievementId #3 (cumulative count=2+1=3) and AchievementId #5 (cumulative count=1) are present. Select AchievementId #3 because it has the larger cumulative count.

For order #4, AchievementId #4 (cumulative count=1), AchievementId #5 (cumulative count=1+1=2), and AchievementId #6 (cumulative count=1) are present. Select AchievementId #5 because it has the larger cumulative count.

For order #5, AchievementId #5 (already selected) and AchievementId #7 (cumulative count=1) are present. Note, AchievementId #4 and AchievementId #6 each have a cumulative count=1. Select AchievementId #7.

For order #6, AchievementId #6 (cumulative count=1+1=2) and AchievementId #8 (cumulative count=1) are present. Note, AchievementId #4 has a cumulative count=1. Select AchievementId #6 because it has the larger cumulative count.

For order #7 AchievementId #7 (already selected) is present. Note, AchievementId #4 and AchievementId #8 each have a cumulative count=1. Select AchievementId #4 because it came first.

For order #8, AchievementId #8 (cumulative count=1+1=2) is present. Select AchievementId #8.

Based on the data above, the returned AchievementId sequence will be {1, 2, 3, 5, 7, 6, 4, 8}

There are a few drawbacks to the approach of the method 1b. For example, the method 1b does not identify or account for achievement dependencies (e.g., various titles may require some achievements to be earned before others. The method 1b also uses significantly more space than the method 1a. While the method 1a uses a table having a size relative to the number of achievements, the approach used by the method 1b requires a table having a size relative to the number of achievements squared.

Graph Based Methods

Figure 7A:
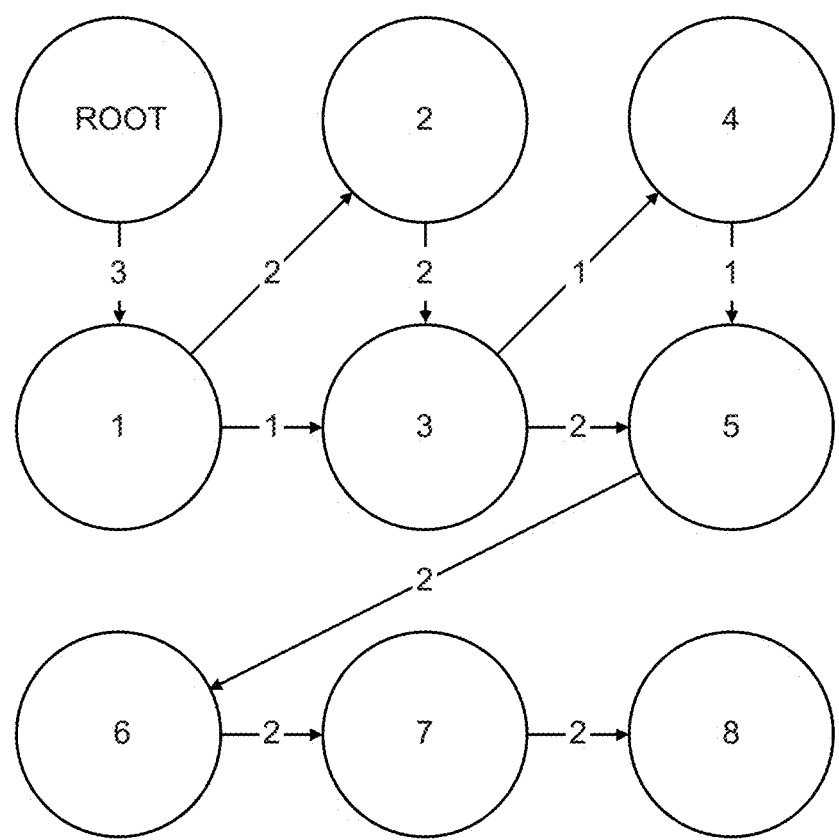
FIG. 7A is an illustration of an achievement dependency graph created for the example raw real world achievement data illustrated in FIG. 3.

So far, the methods presented have been non-graph based. The system 100 is configured to define a weighted directed graph (referred to as an "achievement dependency graph"), in which each vertex represents an achievement and each edge represents another achievement that can be earned immediately after the current achievement. Each edge has a weight representing how many times an achievement has been earned immediately after the current achievement. Thus, for each earned achievement in a sample (e.g., Sample 1, Sample 2, and Sample 3), the system 100 increments the weight of the edge between the vertex representing the current achievement, and the vertex representing the achievement earned immediately after it. If the current achievement is the first earned achievement in a sample, the system 100 increments the weight of the edge between the vertex representing the root and the vertex current the current achievement. If an edge does not exist, the system 100 creates it. Methods of constructing weighted directed graphs are known to those of ordinary skill in the art and will not be described in detail herein. FIG. 7A depicts an expected graph based on the example raw real world achievement data illustrated in FIG. 3.

Figure 7B:
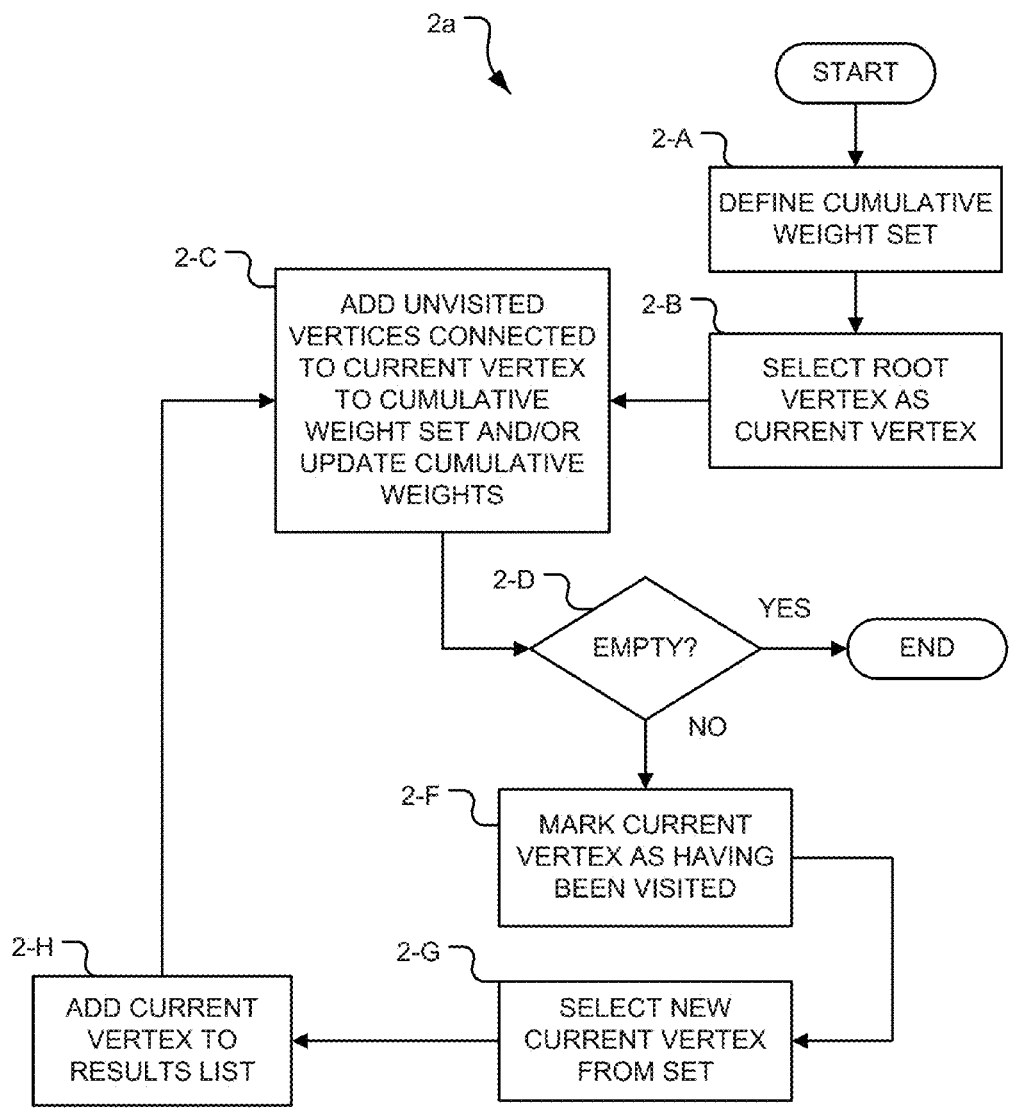
FIG. 7B is a flow diagram of a third method of obtaining an achievement order (or sequence).

Once the achievement dependency graph is built, it provides the basis for several methods for determining achievement order dependencies. For example, FIG. 7B is a flow diagram of a method 2a upon which methods 2b and 2c both described below are based. The method 2a may be performed by the system 100.

In first block 2-A, the system 100 defines a cumulative weight set of {TargetVertex, Weight} pairs to store the cumulative weights of unvisited vertexes of the achievement dependency graph. Then, in block 2-B, the system 100 selects the root vertex as a current vertex.

In block 2-C, for each edge of the current vertex, where the target vertex has not been visited, the system 100 adds the target vertex and edge weight to the cumulative weight set. If the vertex is already listed in the cumulative weight set, the system 100 updates the weight associated with the vertex by adding the weight of the edge to the existing weight in the cumulative weight set.

In decision block 2-D, the system 100 determines whether the cumulative weight set is empty. If the cumulative weight set is empty, the method 2a terminates. On the other hand, if the cumulative weight set is not empty, the system 100 advances to block 2-F.

In block 2-F, the system 100 marks the current vertex as visited.

In block 2-G, the system 100 selects and removes the vertex with the greatest cumulative weight from cumulative weight set as the new current vertex.

In block 2-H, the system 100 adds the AchievementId assigned to the current vertex to the result list of AchievementIds. Then, the system 100 returns to block 2-C.

After the method 2a has terminated, the achievement sequence is the result list of AchievementIds.

Using the example data of FIG. 3, the method 2a would return the sequence {1, 2, 3, 5, 6, 7, 8, 4}.

The approach of the method 2a may use less memory than the Method 1b. Further, the method 2a may be agnostic with respect to sample set size. On the other hand, the method 2a does not identify or account for achievement dependencies (e.g., various titles may require some achievements to be earned before others). Further, the method 2a may involve greater engineering complexity due to graph construction and maintenance.

Method 2b: Graph Based+Unification

So far, the methods presented have not accounted for achievement dependencies, which means those methods ignore the fact that some achievements that while not as commonly earned, should be earned before other achievements (AchievementId 4 in the above examples). Introducing Unification (a standard process in computer science) solves this problem.

Figure 7C:
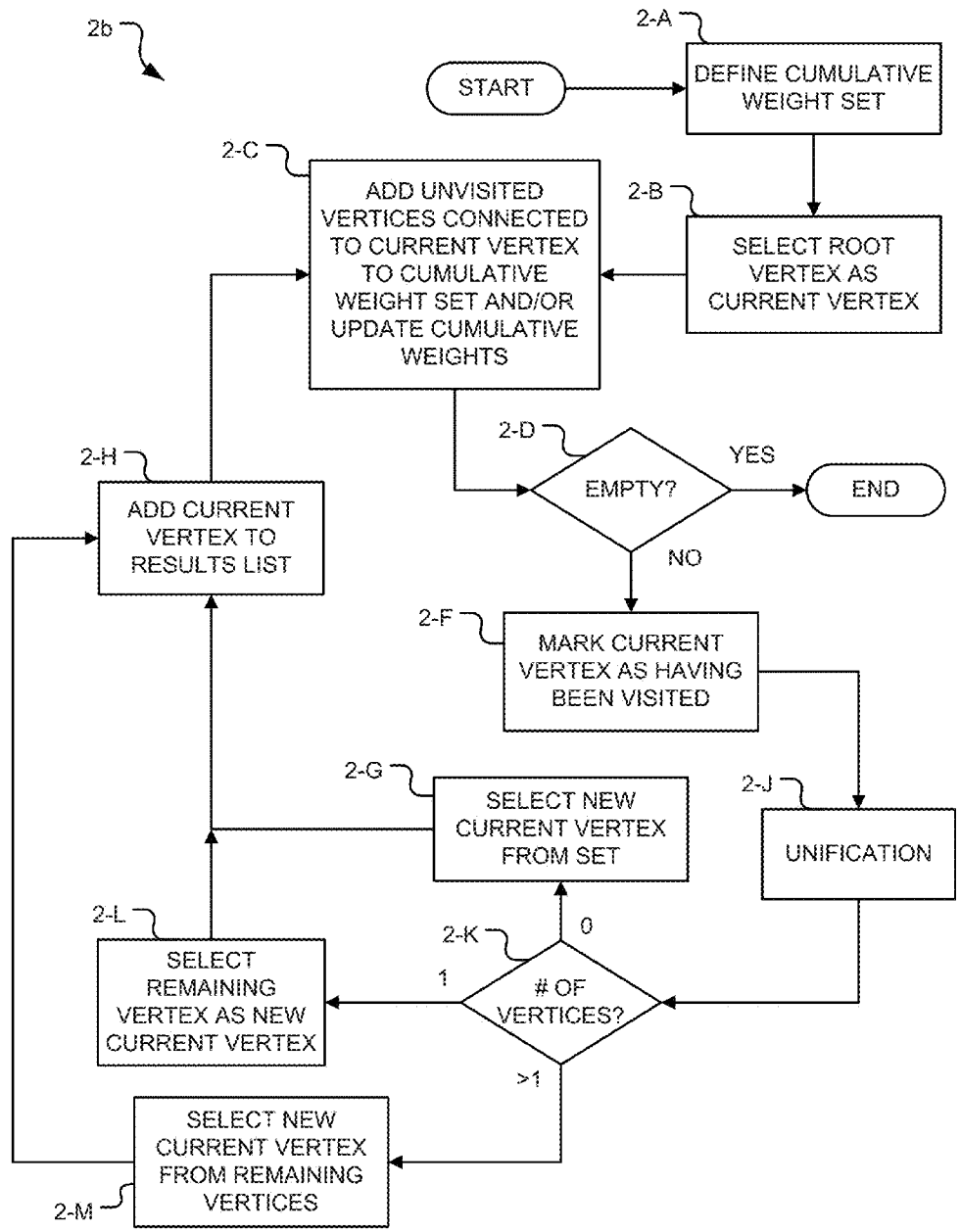
FIG. 7C is a flow diagram of a fourth method of obtaining an achievement order (or sequence).

FIG. 7C is a flow diagram of a method 2b that incorporates unification. The method 2b may be performed by the system 100. The method 2b is substantially similar to the method 2a described above and like reference numerals have been used to identify like elements in FIGS. 7B and 7C. The method 2b differs from the method 2a with respect to blocks 2-J, 2-K, 2-L, and 2-M.

In the method 2b, after block 2-F, the system 100 advances to block 2-J. In block 2-J, the system 100 performs Unification on the set of vertices in the cumulative weight set, excluding any vertex that is referenced by any other vertex in the cumulative weight set. For example, in the above graph, after visiting vertex 3, the cumulative weight set will contain both [{4, 1} and {5, 2}]. Unification will exclude vertex 5, because vertex 4 has an edge that references vertex 5, leaving only vertex 4 as a remaining vertex. There are three possible outcomes of Unification:

1. one vertex remains;
2. no vertices remain; and
3. two or more vertices remain.

In decision block 2-K, the system 100 determines how many vertices remain after unification. If zero vertices remain, the system 100 advances to block 2-G. If one vertex remains, the system 100 advances to block 2-L. If more than one vertex remains, the system 100 advances to block 2-M.

In block 2-G, as discussed above, the system 10 selects the vertex in the cumulative weight set having the highest cumulative weight as the new current vertex.

In block 2-L, the system 10 selects the remaining vertex as the new current vertex.

In block 2-M, the system 10 selects the remaining vertex that has the greatest cumulative weight (in the cumulative weight set) as the new current vertex.

Using the example data of FIG. 3, the method 2b will return the sequence {1, 2, 3, 4, 5, 6, 7, 8}.

The approach of the method 2b accounts for achievement dependencies, which addresses cases where certain less popular achievements should be earned before more popular ones. On the other hand, because cumulative weight is no longer the sole determinant, any erroneous or low frequency data can cause Unification to incorrectly eliminate vertices with a high cumulative weight (Unification does not account for weights).

Method 2c: Graph Based+Noised Filtered+Unification

All methods presented so far rely on the input achievement data being correct and free from noise. Unfortunately, real world data is not so perfect, with noise manifesting as edges with low weights. Because Unification eliminates any vertex referenced by any other vertex, noisy low weight edges cause Unification to exclude vertexes incorrectly.

Noise edges can be reduced by excluding edges with a weight below a certain threshold value. In practice, it was found that a threshold value relative to the average edge weight*0.05 of the current vertex works best. For example, if the average edge weight of the current vertex is 2.5, the threshold value would be 0.125. While an example threshold value has been provided, other values may be used. For example, higher threshold values can be used to increase noise reduction and improve performance (by reducing the number of vertexes considered) at the expense of potentially omitting certain achievements that should be occur before others.

Figure 7D:
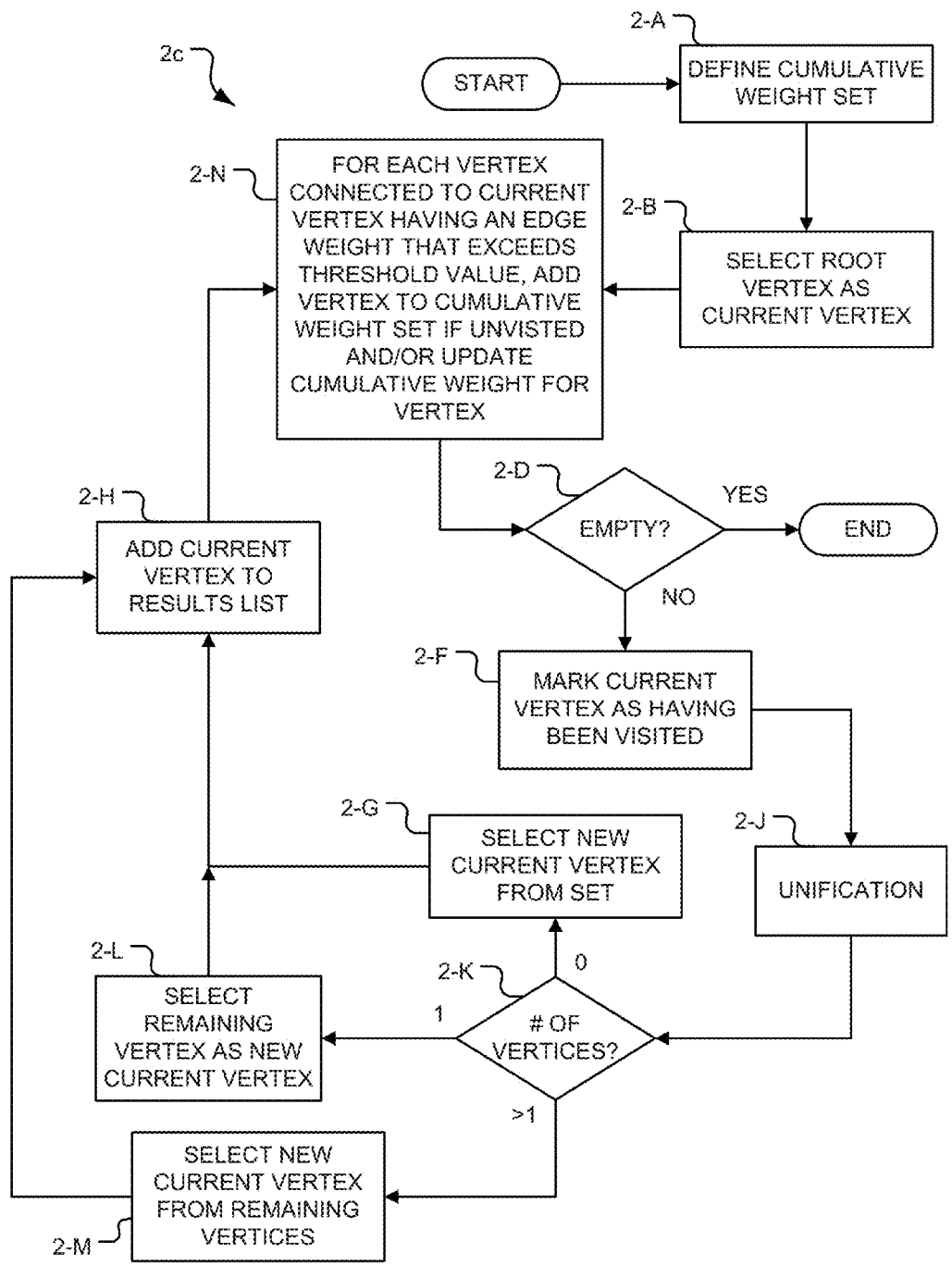
FIG. 7D is a flow diagram of a fifth method of obtaining an achievement order (or sequence).

FIG. 7D is a flow diagram of a method 2c that incorporates noise filtering. The method 2c may be performed by the system 100. The method 2c is substantially similar to the method 2b described above and like reference numerals have been used to identify like blocks. However, the method 2c omits the block 2-C of the method 2b. In the method 2c, the block 2-C is replaced with block 2-N.

Specifically, in block 2-N, rather than adding each unvisited target vertex and edge weight to the cumulative weight set, the system 100 adds each unvisited target vertex and edge weight to the cumulative weight set only if the edge weight is greater than the threshold value. If the vertex is already listed in the cumulative weight set and has an edge weight that is greater than the threshold value, the system 100 updates the weight associated with the vertex by adding the weight of the edge to the existing weight in the cumulative weight set.

The method 2c eliminates noise related Unification errors and accounts for achievement dependencies, which addresses cases where certain less popular achievements should be earned before more popular ones. However, the method 2c may be more complex to engineer than the methods 1a, 1b, 2a, and 2b.

Interestingly, some methods that do not utilize Unification, such as the methods 1a and 1b, may already resilient to noise because low weight (noisy) edges are considered last.

Method 2d: Collaborative Filtering

Using the achievement dependency graph described above, it is also possible to apply collaborative filtering techniques such as Nearest Neighbor or Slope One (the application of such being an additional novel approach to determining order). However, such techniques may be less efficient than the cumulative weight set based methods described above. To use general collaborative filtering techniques, the system 100 may utilize any of the methods 2a, 2b, or 2c (illustrated in FIGS. 7B, 7C, and 7D, respectively), modified such that when selecting a new current vertex, the system 100 optionally (depending on the collaborative filtering technique being utilized), converts the dependencies into a matrix of vertex edge pairs, and evaluates the collaborative filter iteratively, selecting the achievement with the highest value to identify the next achievement in a recommended order.

Figure 7E:
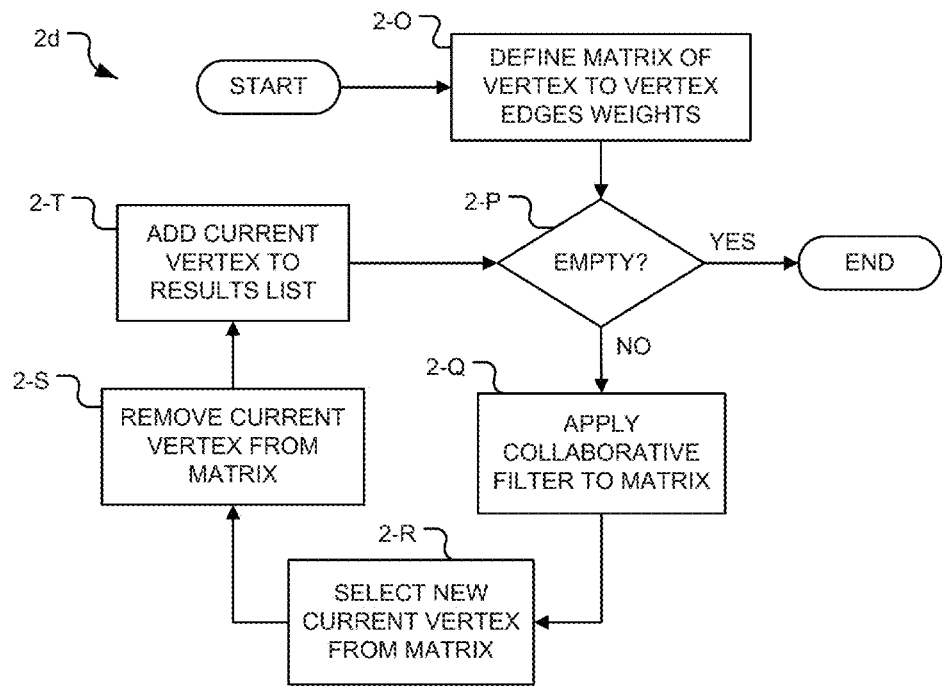
FIG. 7E is a flow diagram of a method of a sixth method of obtaining an achievement order (or sequence).

FIG. 7E is a flow diagram of a method 2d that incorporates collaborative filtering. The method 2d may be performed by the system 100.

In first block 2-O, the system 100 defines a square matrix having N number of rows by N number of columns where the value of N is equal to the number of vertexes in the achievement dependency graph. Each matrix position represents the number of times a particular vertex (represented by the column number in the matrix) occurs after another vertex (represented by the row number in the matrix) in the achievement dependency graph. For example, if the cumulative edge weight from vertex V1 to vertex V2 is 20 (vertex V2 occurs after vertex V1 20 times), the value in the matrix at position [1, 2] (i.e., the value in a matrix cell in the first row and the second column) would be 20.

In decision block 2-P, the system 100 determines whether the matrix is empty. The matrix is empty if it does not include any rows or columns. If the matrix is empty, the method 2d terminates. On the other hand, if the matrix is not empty, the system advances to block 2-Q.

In block 2-Q, the system 100 applies a collaborative filtering technique to the matrix. The collaborative filtering technique adjusts the values in each row such that the column value of the cell within the row that has the greatest value represents the vertex most likely to come after the vertex represented by row value. For example, if the third row (which represents the vertex V3) includes the values [2, 5, 0] in the first, second, and third columns, the second cell in the row has the greatest value. Therefore, the second vertex (vertex V2) is most likely to come after the third vertex (vertex V3).

After applying the collaborative filter, in block 2-R, the system 100 selects a new current vertex from the matrix. If block 2-R is being performed for the first time, the root vertex is selected as a previously selected current vertex. If block 2-R is not being performed for the first time, the current vertex was selected previously. Then, the system 100 selects a new current vertex to replace the previously selected current vertex. The new current vertex may be selected by first selecting the cell having the greatest value in the row that represents with the previously selected current vertex. Then, the system 100 selects the vertex represented by the column value of the selected cell as the new current vertex.

In block 2-S, the system 100 removes the row and column that represent the previously selected current vertex from the matrix.

In block 2-T, the system 100 adds the AchievementId assigned to (which was the column value representing) the current vertex to the result list of AchievementIds. Then, the system 100 returns to decision block 2-P.

After the method 2d has terminated, the achievement sequence is the result list of AchievementIds.

The approach of the method 2d may have lower implementation complexity than the method 2c because the method 2d is able to leverage pre-built collaborative filters such as Nearest-Neighbor or Slope One. Further, the method 2d may be optimized by directly constructing a vertex matrix without first constructing the achievement dependency graph. For example, the system 100 may map the AchievementIds directly to the rows and columns of the matrix because there is a 1:1 mapping between vertexes in the achievement dependency graph and AchievementIds. However, depending on the implementation details, the method 2d may be less accurate than the methods 2b and 2c (illustrated in FIGS. 7C and 7D, respectively) because most collaborative filters do not perform Unification.

Storing and Retrieving Achievement Order Dependencies

Figure 8:
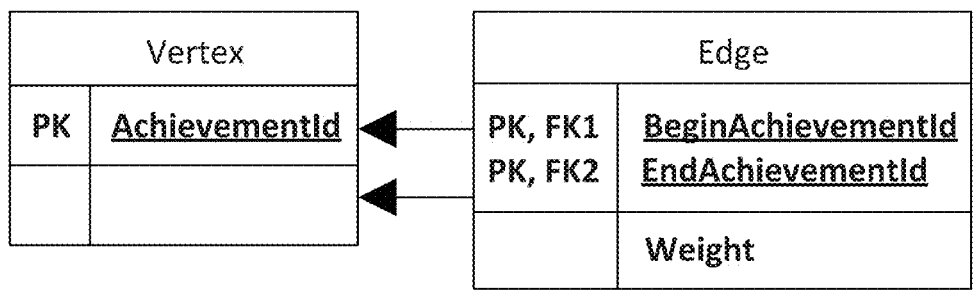
FIG. 8 depicts an exemplary schema in which an achievement dependency graph may be stored.

Care should be taken in how information is stored and retrieved to help ensure the system 100 is configured to determine achievement order dependencies. The achievement order dependency methods described above are extremely fast, running in O(N) time, where N is the number of achievements. Because of this, it is more effective to store the achievement dependency graph itself rather than any derived achievement order. Doing so also makes it simpler to update results in real-time because it is a very fast operation to update achievement dependency graph weights. The tradeoff is that achievement order dependencies are computed on-demand, however the cost is minimal as the method is computationally inexpensive. The achievement dependency graph may be stored in a schema (or a variant thereof). By way of a non-limiting example, FIG. 8 depicts an exemplary schema (or a variant thereof) in which the achievement dependency graph may be stored. The schema illustrated includes a "Vertex" table and an "Edge" table. These tables may be stored in the database 120 (see FIG. 1).

As mentioned above, the method 1a may be implemented using a table (e.g., an AchievementFrequency table illustrated in FIG. 5B) organized by {AchievementId, Count}, or a variant thereof. Further, the method 1b may be implemented using a table (e.g., an OrderedAchievementFrequency table illustrated in FIG. 6B) organized by {{Order, AchievementId}, Count}, or a variant thereof.

Recommending an Achievement Order

Using an achievement dependency order, the recommended achievement order can be obtained by taking the achievement dependency order and excluding any earned achievements by a gamer. This is sufficient because the achievement dependency order represents the typical achievement order, and any achievements earned by a particular gamer do not change the order in which achievements are typically earned.

Determining Most-Needed Achievements

Although it is relatively straightforward to compute the recommended achievement order, it is much more difficult to compute a set of most-needed achievements for a gamer. Computing the set of most-needed achievements requires consideration of achievement dependencies, as only needed-achievements with satisfied prerequisites should be returned.

Having the set of most-needed achievements is important for the following reasons:

1. the set of most-needed achievements reduces the number of achievements with which a gamer needs to be associated, reducing database, storage, memory, and computation costs, as well as increasing performance; and
2. the set of most-needed achievements improves relevance by providing a more concise and targeted set of results.

Figure 9:
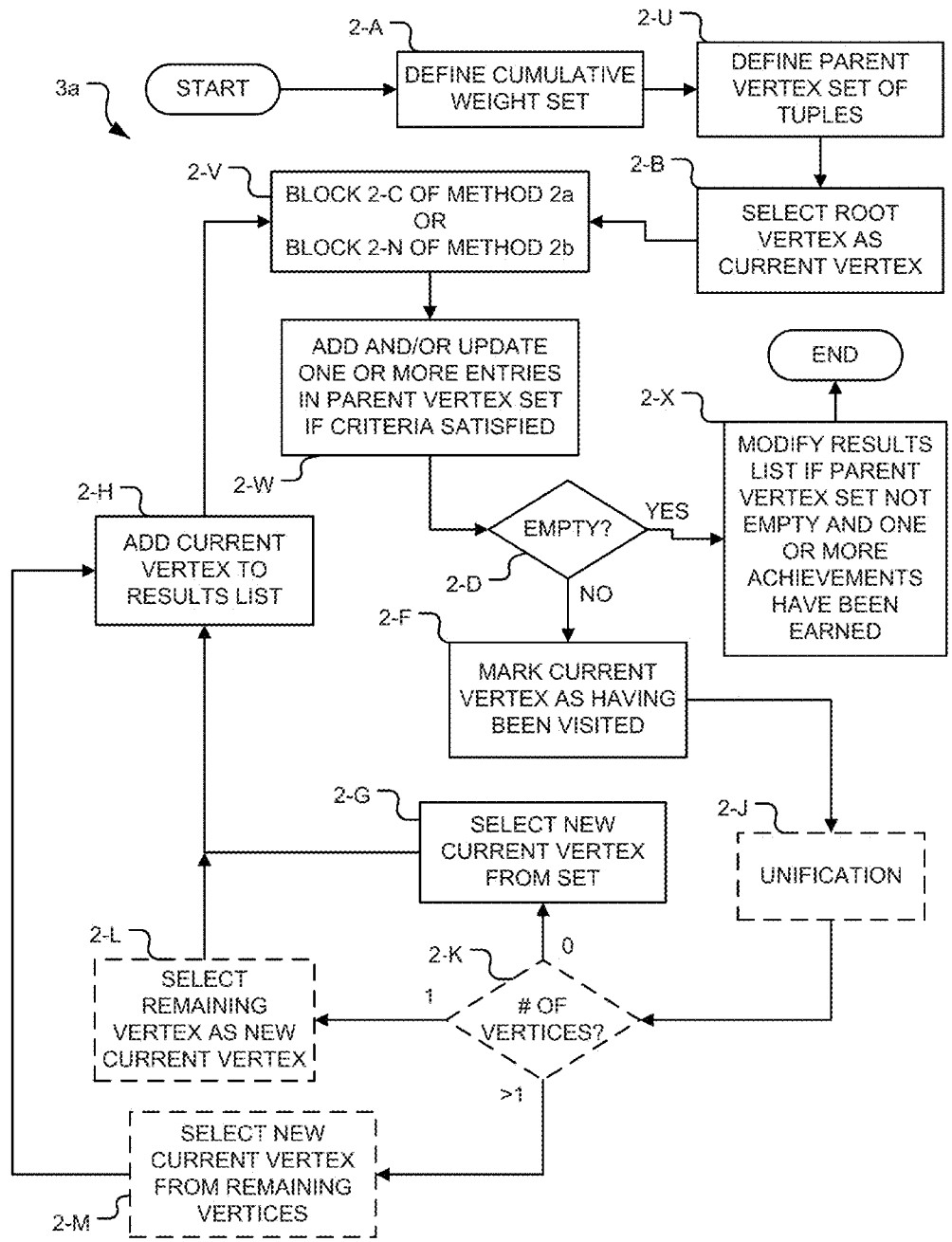
FIG. 9 is a flow diagram of a method of determining a set of most-needed achievements.

FIG. 9 is a flow diagram of a method 3a of determining the set of most-needed achievements. The method 3a may be characterized as a modification of the graph-based methods 2a, 2b, and 2c (see FIGS. 7B, 7C, and 7D, respectively). The embodiment of the method 3a illustrated is substantially similar to the method 2c described above and like reference numerals have been used to identify like elements in FIGS. 7D and 9.

In the method 3a, blocks 2-J, 2-K, 2-L, and 2-M are optional. In embodiments of the method 3a that omit optional blocks 2-J, 2-K, 2-L, and 2-M, the system 100 advances to block 2-G after block 2-F.

In the method 3a, after first block 2-A, the system 100 advances to block 2-U. In block 2-U, the system 100 defines a parent vertex set of {Vertex, {ParentVertex, ParentEdge-Weight}} tuples. This set stores the parent vertex of each vertex. Then, the system 100 advances to block 2-B.

After selecting the root vertex as the current vertex in block 2-B (described above), the system 100 advances to block 2-V.

In block 2-V, either block 2-C of the method 2b or block 2-N of the method 2c is performed by the system 100. Then, the system 100 advance to block 2-W.

In block 2-W, if the system 100 added a vertex and edge weight to the cumulative weight set, the system 100 also adds an entry to the parent vertex set. If the entry already exists for the vertex in the parent vertex set, the system 100 replaces the entry only if the vertex has not been visited, and the edge weight of the potential new parent is greater than the edge weight of the existing parent.

If the decision in decision block 2-D is "YES," the parent vertex set is not empty, and the gamer has earned one or more achievements, in block 2-X, the system 100 modifies the results list to obtain a most-needed achievement set. For example, after the achievement order (or AchievementId sequence) is constructed, achievements that have been earned by the gamer may be removed, and achievements having parents that have not been earned may be removed. Thus, the modified AchievementId sequence includes only achievements that (a) have not been earned by the gamer, and (b) have parents that have been earned by the gamer. In the case where the resulting AchievementId sequence is empty, the system 100 may modify the AchievementId sequence to include a unique AchievementId value that indicates there are no most-needed AchievementIds.

The most-needed achievement set (or modified AchievementId sequence) may be stored the database 120 of the system 100 using an index (not shown) that maps most-needed achievements to the gamer. By repeating the method 3a, a set of most-needed achievements may be associated with each gamer.

Figures 10, 11:
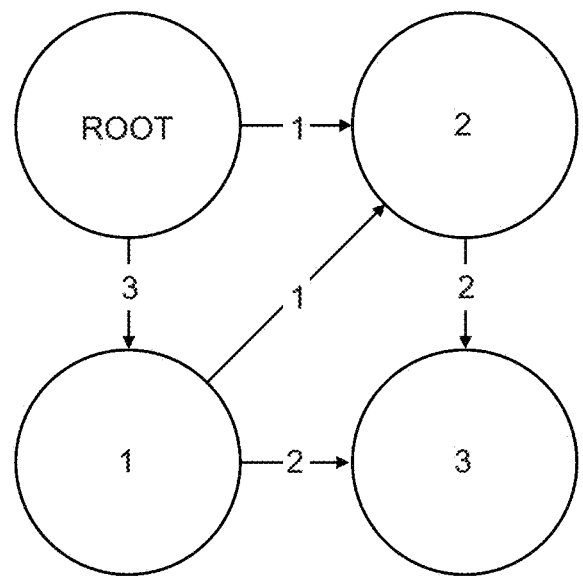
FIG. 10 is an illustration of an exemplary achievement dependency graph.
FIG. 11 depicts an exemplary schema in which an index having the structure {AchievementId, [{GamerId, LastOnline}]} may be stored.

Consider the hypothetical achievement dependency graph (not based on any of the above example data) illustrated in FIG. 10. The method 3a (see FIG. 9) would perform the following analysis with respect to the achievement dependency graph illustrated in FIG. 10. After visiting the root vertex (i.e., after blocks 2-A, 2-U, 2-B, 2-V, and 2-W in the method 3a), the parent vertex set will contain {1, {root, 3}} and {2, {root, 1}}, and the cumulative weight set will contain {1, 3} and {2, 1}. Because vertex 1 has the highest cumulative weight of 3, it is visited next (i.e., selected as the new current index in block 2-M). After visiting vertex 1 (i.e., after blocks 2-H, 2-V, and 2-W in the method 3a), the parent vertex set will be [{1, {root, 3}, {2, {root, 1}} and {3, {1, 2}}], and the cumulative weight set will contain {2, 2} and {3, 2}. Unification (in blocks 2-J, 2-K, and 2-L) determines vertex 2 is visited next. After visiting vertex 2 (i.e., after blocks 2-H, 2-V, and 2-W in the method 3a), the parent vertex set will remain unchanged and the cumulative weight set will contain {3, 4}. Thus, the vertex 3 is selected as the new current index (in block 2-L in the method 3a).

After vertex 3 is selected as the new current index, the cumulative weight set is empty and the decision in decision block 2-D in the method 3a is "YES." Based on the analysis described above, the final parent vertex set is [{1, {root, 3}, {2, {root, 1}} and {3, {1, 2}}]. Note the parent vertex is only changed if a potentially new parent vertex has a greater edge weight than the existing parent vertex. In the example above none of the potentially new parent vertices ever had a greater edge weight than the existing parent vertex.

Consider a gamer that has earned only achievement 2, the parent vertex set enables the most-needed achievement set to be determined in block 2-X in the method 3a as follows:

Vertex 1 is included (in the most-needed achievement set) because Vertex 1 has not been earned and its parent, the root, has been earned (the root is always treated as earned);

Vertex 2 is not included (in the most-needed achievement set) because Vertex 2 has already been earned; and Vertex 3 is not included (in the most-needed achievement set) because its parent, vertex 1, has not been earned.

Correctly, the final most-needed achievement set is {1}, and is easily verified: achievement 1 comes before achievement 2 in the recommended achievement order, while achievement 3 comes after achievement 2 in the recommended achievement order. Achievement 3 is of significantly lower priority as it is predicated by both achievements 1 and 2.

Storing and Retrieving which Gamers Most-Need an Achievement

In order to determine rapidly which gamers most need an achievement, an index may be built and stored for later retrieval (typically in a database). Such an index might have the structure {AchievementId, [{GamerId, LastOnline}]} and can be stored using a schema illustrated in FIG. 11. The schema illustrated may be stored in the database 120 (see FIG. 1).

For each most-needed achievement for a game, an entry is added to the index, as well as any additional metadata that may help with relevance (for example a timestamp stored in the LastOnline parameter). The timestamp stored in the LastOnline parameter enables gamers that do not play regularly to be aged out of the index, and enables queries to quickly determine which gamers are currently online. Notably a size-limited max-heap data structure ordered by LastOnline may be used because of its space efficient and online properties.

Determining which Gamers Need the Most Most-Needed Achievements

In order to determine which gamers need the most most-needed achievements, a most-needed achievement index as described above is repeatedly queried for each supplied most-needed achievement. Each time a gamer appears in a query result a counter is incremented for that gamer. After the index has been queried for all most needed-achievements, gamers are returned in descending order by counter value.

Determining Gamer Interest

It is often necessary to compute gamer title interest values to assess (or evaluate) gamer interest in a previously played or experienced title as well as for other purposes including but not limited to gamer classification and making title recommendations (both played and unplayed).

High gamer title interest values may be used to classify more hardcore users, and low gamer title interest values may be used to classify more casual users, respectively. The method 500 (see FIG. 16) may be repeated for multiple users and/or titles and the values generated by the method 500 may be used to as an input for the service provider 190. Aggregating the gamer title interest values determined for individual users or and/or multiple users (in block 525 of the method 500 illustrated in FIG. 16) to assess user behavior is an example of a Business Intelligence function that the service provider 190 may be configured to perform. The results of this analysis may be a measure of the gamers' interest in the title(s).

Titles may have one or more properties (e.g., genre, publisher, developer, rating, release date, marketing budget, etc.) the values of which may be used to perform filtering operations. By way of a non-limiting example of a Business Intelligence function, the service provider 190 may be configured to aggregate the gamer title interest values, and filter this data for particular title property values. The results of this analysis may be a measure of the gamers' interest in titles that share the same (or similar) title property values.

Title recommendations may be made using the gamer title interest values as an input to an Information Filtering system configured to identify titles of interest to a user or set of users based on the interests of other similar users. Making recommendations in this way is an example of an Information Filtering function that a service provider 190 may be configured to perform.

Figure 16:
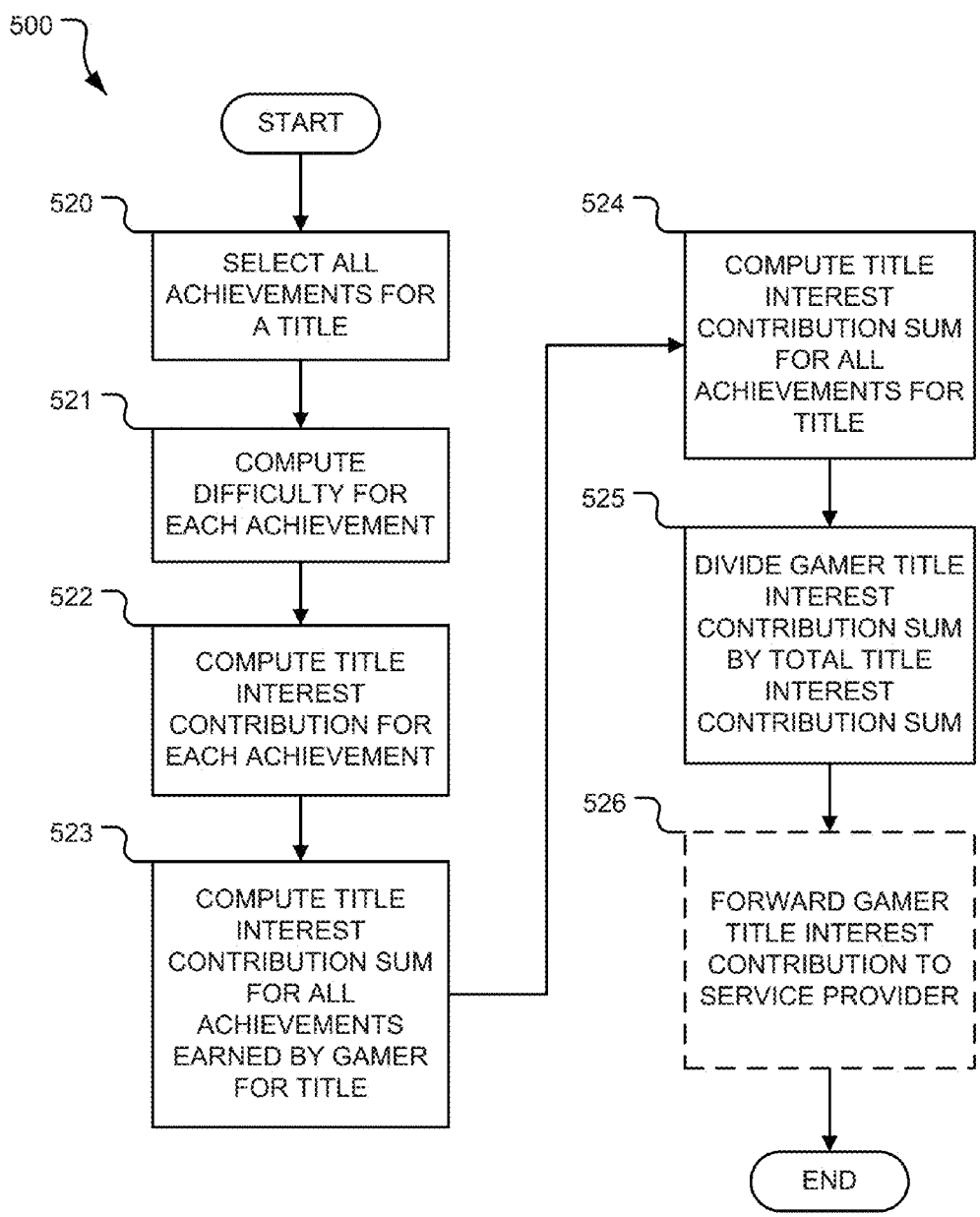
FIG. 16 is a flow diagram of a method of determining gamer interest in a title based at least in part on achievements earned by the gamer.

FIG. 16 is a flow diagram of a method 500 of determining gamer interest in a title based at least in part on achievements earned by the gamer. The method 500 may be performed by the system 100.

In first block 520, the system 100 selects one or more achievements for a particular title. By way of an example, the system 100 may select all achievements that may be earned for the particular title in block 520.

Then, in block 521, the system 100 computes an achievement difficulty for each achievement selected in block 520. The achievement difficulty may be determined as a percent of gamers who have earned the achievement (e.g., achievement difficulty=(number of gamers who earned the achievement)/(total number of gamers who have played the title)). Lower values indicate an achievement is more difficult to earn. Conversely, higher values indicate an achievement is easier to earn.

In block 522, the system 100 computes a title interest contribution for each achievement as a function of achievement difficulty (e.g., title interest contribution=1−(achievement difficulty)). Using this metric, achievements that are more difficult to earn indicate greater title interest.

In block 523, the system 100 identifies those of the achievements selected in block 520 that were earned by a particular gamer and totals the title interest contributions for those achievements to obtain a gamer interest value.

In block 524, the system 100 totals the title interest contributions for the achievements selected in block 520 to obtain a total achievement interest value for the title.

In block 525, the system 100 may scale the gamer interest value for the title (determined in block 523) to allow for comparisons with other titles and gamers. For example, the gamer interest value for the title may be divided by the total achievement interest value determined in block 524 to obtain a gamer title interest value ((e.g., gamer title interest value=(gamer interest value)/(total achievement interest value)).

In optional block 526, the system 100 may forward the gamer title interest value (determined in block 525) and/or one or more of the values determined in blocks 521, 522, 523, and 524 to the service provider 190 (illustrated in FIG. 1).

Then, the method 500 terminates.

Optionally, the system 100 may be configured to generate a display that includes an indicia that represents a level of interest in a title. The display generated by the system 100 may be displayed by one or more of the subsystems 110, and/or one or more of the client computing devices 170. By way of a non-limiting example, the output page 242 illustrated in FIG. 14C may include text (e.g., "HARDCORE," "CASUAL," and the like) indicating the level of interest in a particular title (e.g., "FUN ADVENTURES"). In the example illustrated, the text is displayed next to a label "User Rating." The display may be generated in addition to forwarding the gamer title interest values (and/or other values) to the service provider 190.

Recommending Title Order

Because achievements are a part of titles, the system 100 may be configured to determine and/or display which titles a gamer should play, or more specifically which titles a gamer would be most interested in playing from the set of titles a gamer has played. The system 100 may also be configured to determine and/or display an ordered list of recommended and/or most-needed achievements for each title, as well as determine and/or display a set of gamer matches for each achievement. Such abilities enable the system 100 to avoid requiring a user to specify a title, enabling matchmaking to "just work."

Figures 12A, 12B:
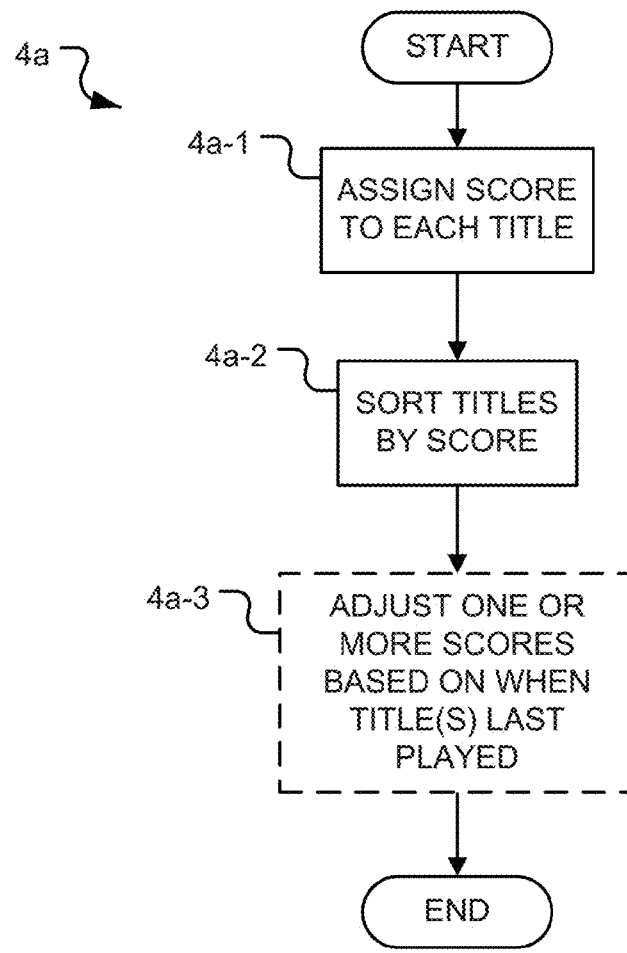
FIG. 12A is flow diagram of a method of determining a recommended title order for a particular gamer.
FIG. 12B illustrates a GamerTitleLastPlayed table that may be used by the method of FIG. 12A.

Unlike achievements, titles tend to be standalone entities and have few or no ordering dependencies. As such, a graph based method such as the one described above for achievements is unsuitable. Instead, FIG. 12A is flow diagram of a method 4a that may be used to recommend titles to a particular gamer. In first block 4a-1, the system 100 assigns a score to each title for the particular gamer. Then, in block 4a-2, the system 100 sorts the titles based on the scores assigned to the titles. For example, the titles may be sorted by score in descending order. Then, in block 4a-3, the system 100 returns (e.g., displays) the sorted list of titles.

In optional block 4b-4, the system 100 adjusts the score(s) assigned to one or more titles based on how recently the one or more titles were played by the particular gamer. It is often useful to determine and/or display one or more recently played titles by the particular gamer first. This can be done by storing a last-played timestamp with each gamer-title pair. The system 100 may be configured to select the top "Z" number most recently played titles in descending order by last-played timestamp. Each of the top "Z" last-played titles may be assigned a score greater than the scores calculated for other titles. By way of a non-limiting example, last-played title information may be stored using a schema illustrated in FIG. 12B. The schema illustrated may be stored in the database 120 (see FIG. 1).

Then, the method 4a terminates. When performing the method 4a, the system 100 may exclude titles where the particular gamer cannot earn achievements (such as titles with zero achievements or titles where the particular gamer has earned all possible achievements).

Figure 12C:
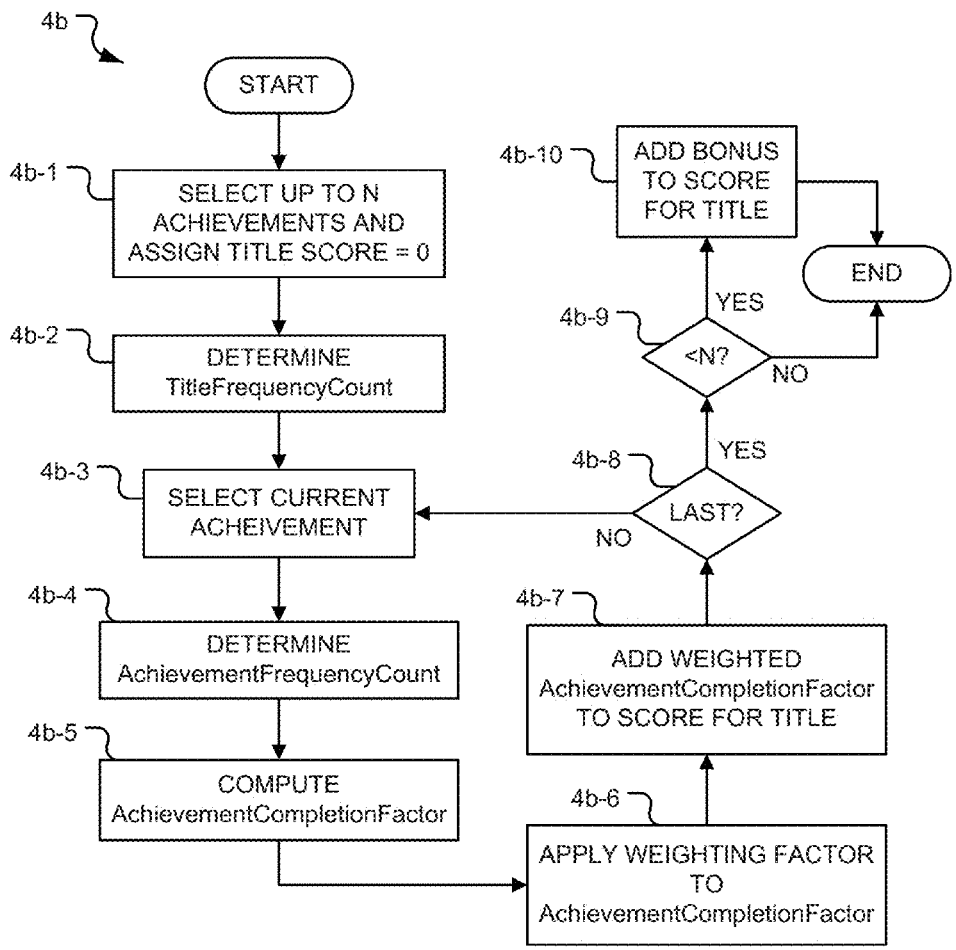
FIG. 12C is flow diagram of a method of assigning a score to a particular title for the particular gamer.

FIG. 12C is a flow diagram of a method 4b. The method 4b may be performed by the system 100 in the block 4a-1 of the method 4a depicted in FIG. 12A. Turning to FIG. 12C, the method 4b may be performed separately for each title.

In first block 4b-1, the system 100 attempts to select "N" number achievements that have not been earned by the particular gamer ("unearned achievements") for the title based on selection criteria (e.g., "most relevant" unearned achievements may be selected based on which achievements are easiest, most-needed, or have other attributes). The selected unearned achievements are ordered according to the selection criteria and each assigned an index value identifying the position of the achievement in the order.

In block 4b-4, the system 100 determines a TitleFrequencyCount value, which is the number of gamers who have played the title. In some embodiments, the order in which blocks 4b-1 and 4b-2 are performed may be reversed.

In block 4b-3, the system 100 selects a current achievement. For example, the current achievement may be selected based on the index values assigned to the selected achievements.

In block 4b-4, the system 100 determines an AchievementFrequencyCount values, which is a number of gamers that have earned the current achievement.

In block 4b-5, the system 100 computes an AchievementCompletionFactor as a function of the AchievementFrequencyCount and TitleFrequencyCount values. For example, the AchievementCompletionFactor may equal the AchievementFrequencyCount value divided by the TitleFrequencyCount value (AchievementFrequencyCount/TitleFrequencyCount). Because AchievementCompletionFactor is representative of achievement difficulty, an AchievementCompletionFactor of 1.0 means every gamer has earned the achievement (easiest). Conversely, an AchievementCompletionFactor of 0.0 means no gamer has earned the achievement (hardest).

In block 4b-6, the system 100 applies a weighting function to the AchievementCompletionFactor to tune the effects of less relevant subsequent (e.g., achievements assigned larger index values) unearned achievements on the score assigned to the title for the particular gamer. For example, the AchievementCompletionFactor may be multiplied by an exponential decay function such as $1/e^{\wedge}x$ (or $1/e^x$), where x is the index value assigned to the current achievement, and e is Euler's number (which is approximately 2.71828).

In block 4b-7, the system 100 adds the weighted AchievementCompletionFactor to the score for the title and the particular gamer.

In decision block 4b-8, the system 100 determines whether the current achievement is the last achievement. The decision in decision block 4b-8 is "YES," when all of the achievements selected in block 4b-1 have been evaluated. On the other hand, the decision in decision block 4b-8 is "NO," when all of the achievements selected in block 4b-1 have not been evaluated.

When the decision in decision block 4b-8 is "NO," the system 100 returns to block 4b-3. When the decision in decision block 4b-8 is "YES," the system 100 advances to decision block 4b-9.

In decision block 4b-9, the system 100 determines whether fewer than "N" number of achievements were selected in block 4b-1. The decision in decision block 4b-9 is "YES," when fewer than "N" number of achievements were selected in block 4b-1. On the other hand, the decision in decision block 4b-9 is "NO," when "N" number of achievements were selected in block 4b-1.

When the decision in decision block 4b-9 is "YES," the system 100 advances to block 4b-10. When the decision in decision block 4b-9 is "NO," the method 4b terminates.

Turning to block 4b-10, because fewer than N achievements remain unearned by the particular gamer, the title is likely to be near completion. Therefore, it may be desirable to further increase the score assigned to the title for the particular gamer. In block 4b-10, the system 100 adds a bonus value to the score. The bonus value may be determined based on at least in part on an UnearnedAchievementCount value. The UnearnedAchievementCount value is equal to N minus the number of achievements select in block 4b-1. For example, the system 100 may determine the bonus value using the following procedure:

(a) repeat block 4b-6 a number of times equal to the UnearnedAchievementCount value, each time using an AchievementCompletionFactor equal to 1, and an index value that starts at the number of achievements select in block 4b-1 and is incremented by one each time block 4b-6 is repeated,
(b) total the results obtained by repeating block 4b-6, and
(c) optionally, multiply the sum by a scaling constant that helps determine how much preference is given to titles nearing completion.

After block 4b-10, the method 4b terminates.

Blocks 4b-3 to 4b-8 help guarantee that a progressively decaying importance is assigned to the unearned achievements (e.g., up to N of the most difficult unearned achievements) selected in block 4b-1.

Block 4b-10 provides a bonus to titles that are near completion.

Figure 13:
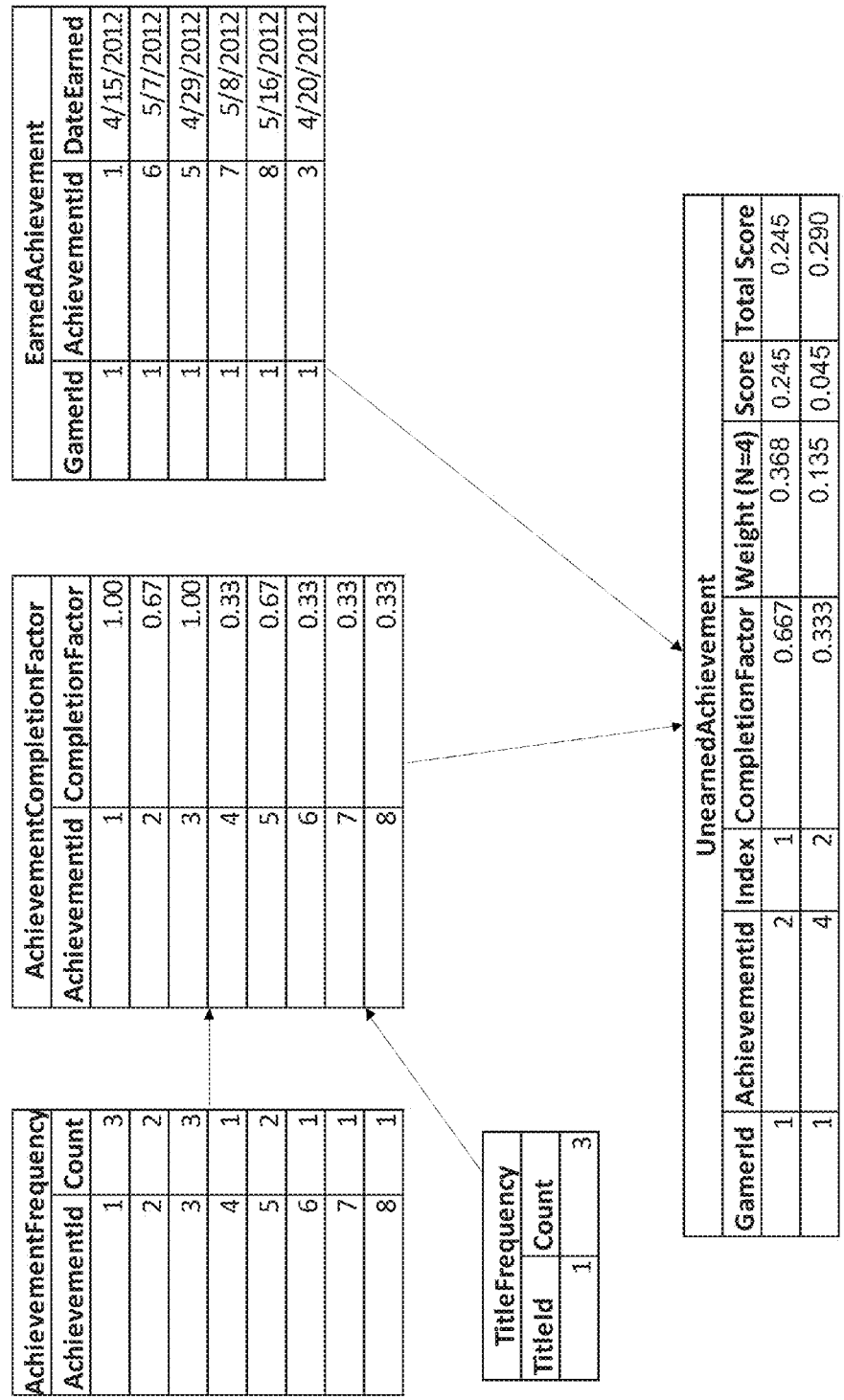
FIG. 13 illustrates pseudo-real world raw achievement data for a gamer 1 and a title 1.

Consider an example illustrated in FIG. 13 based on the pseudo-real world raw achievement data for gamer 1 and title 1. In this example, N equals 4 (i.e., up to the first 4 unearned achievements will be considered in determining a title's score). Further, the gamer 1 has earned all of the available achievements except for achievements 2 and 4. Thus, in block 4b-1, the system 100 selects only the achievements 2 and 4. Because only two achievements were selected, the UnearnedAchievementCount value is equal to two.

In block 4b-2, the system 100 determines the TitleFrequencyCount for title 1 is 3.

In block 4b-3, the system 100 selects the achievement 2. In block 4b-2, the system 100 determines the AchievementFrequencyCount for achievement 2 is 2. Thus, in block 4b-5, the system 100 determines, the AchievementCompletionFactor for achievement 2 is 0.667 because 2 out of the 3 gamers who have played title 1 have earned achievement 2. In block 4b-6, the system 100 applies a weight to the AchievementCompletionFactor for achievement 2. The weight is obtained for achievement 2 at index 1 by computing $1/e^{\wedge}$AchievementIndex (an arbitrary weighting function) or $1/e^{\wedge}1$, which yields 0.368. Multiplying 0.667 by 0.368 yields 0.245 (which is the weighted AchievementCompletionFactor). This value is added to the score (which is zero) for the title. At this point, the total score for the title is 0.245. Repeating blocks 4b-3 to 4b-6 for achievement 4 and as shown in FIG. 13, assigns a weighted AchievementCompletionFactor of 0.045 to achievement 4. Then, in block 4b-7, the system 100 adds the weighted AchievementCompletionFactor assigned to the achievement 4 to the total score for the title, which yields a total score of 0.290.

At this point, the decision in decision block 4b-8 is "YES." Further, because there are only two unearned achievements out of N=4, the decision in decision block 4b-9 is "YES."

Finally, because the title is near completion (there are only two unearned achievements out of N), in block 4b-10, the system 100 adds a bonus value to the score. For example, block 4b-6 may be repeated twice using an AchievementCompletionFactor equal to 1. The first time block 4b-6 is repeated, the weighting factor equals $1/e^{\wedge}3=0.050$. The second time block 4b-6 is repeated, the weighting factor equals 1/e^4=0.018. The bonus value may be calculated by totaling these values, which in this example equals 0.050+ 0.018=0.068. In this example, the sum is not multiplied by a scaling constant. Thus, in this example, the final score for title 1 for gamer 1 is 0.290+0.068=0.358.

The discussion above describes methods of recommending a title order from a set of titles that have been played by a particular gamer. The problem of recommending titles from a set of titles that have not been played by the particular gamer is not considered.

System for Retrieving and Displaying Title and Achievement Matchmaking Recommendations As noted above, the system 100 may be configured to automatically figure out for which titles and achievements to return recommendations given any combination of gamer, title, and/or achievement.

Figure 14A:
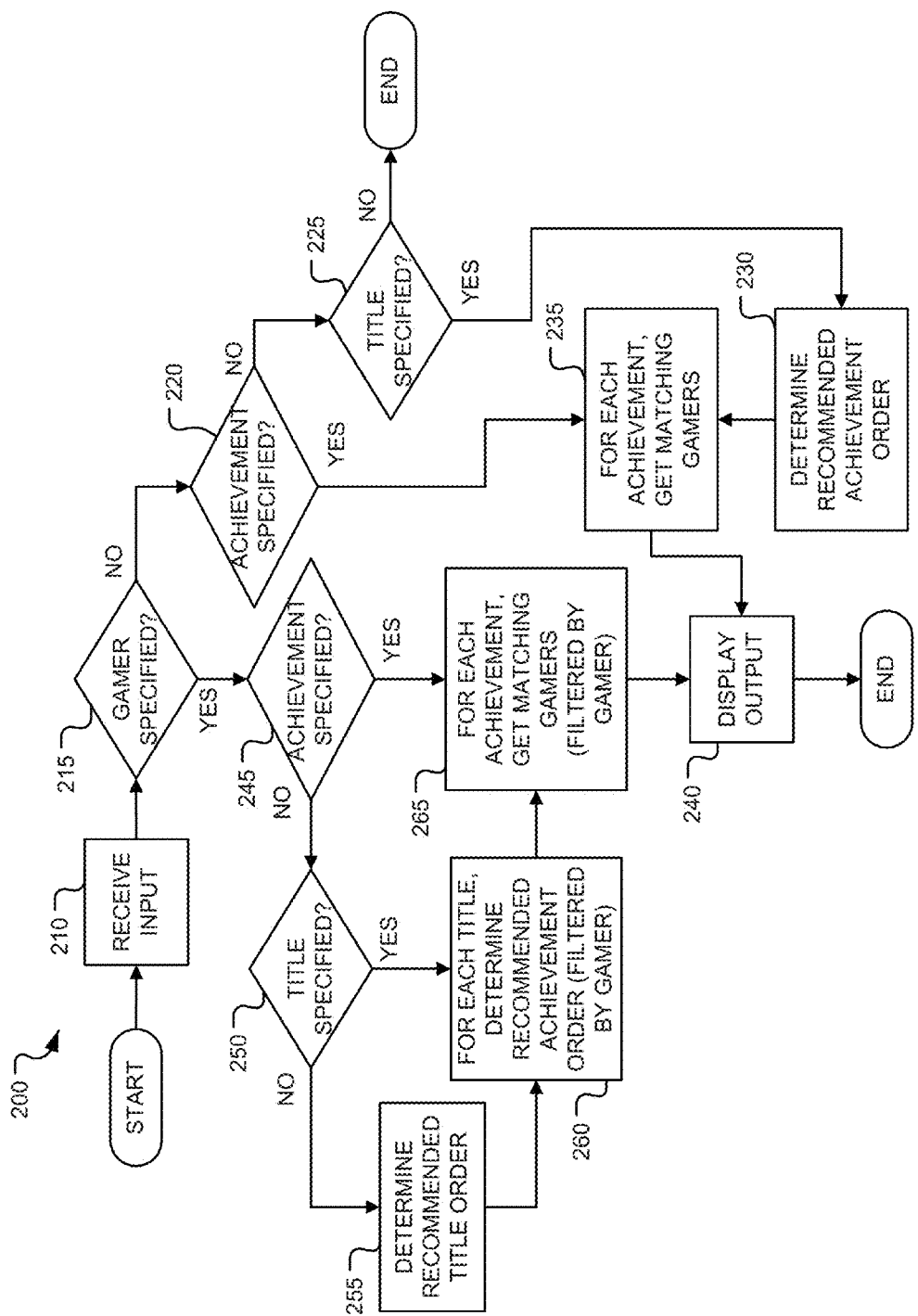
FIG. 14A is a method of identifying gamers based at least in part on user input.

FIG. 14A is a flow diagram of a method 200 performed by the system 100 in which the system 100 interacts with a user and displays results based on user input.

Figure 14B:
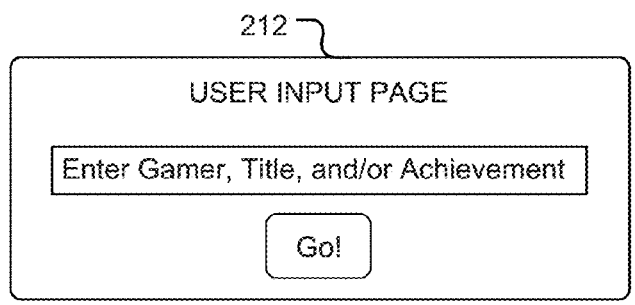
FIG. 14B is an illustration of an exemplary user input page.
Figure 14C:
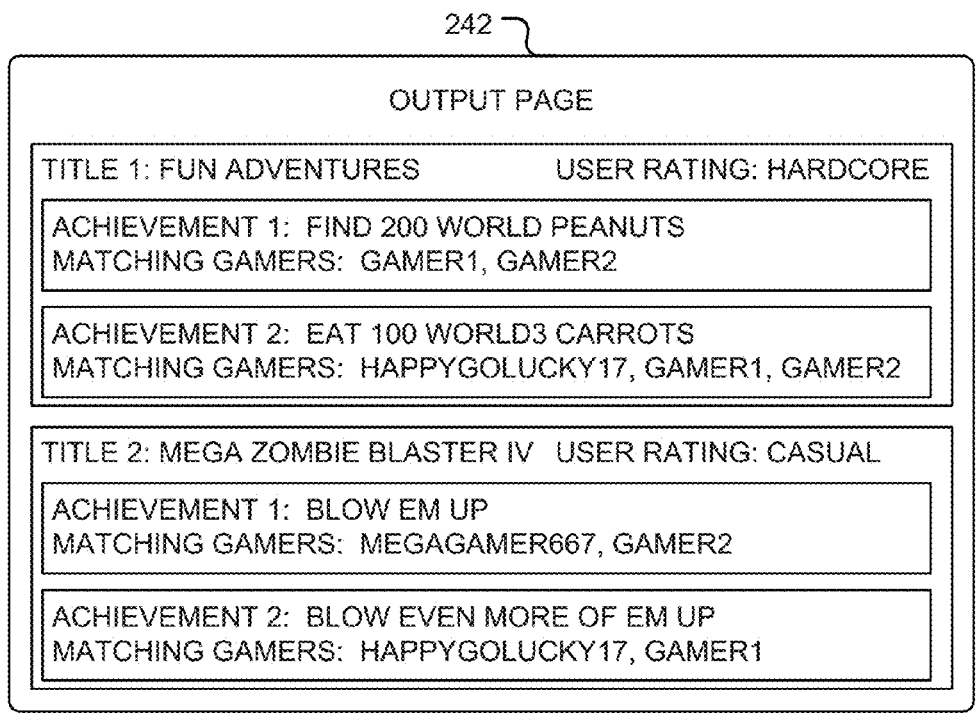
FIG. 14C is an illustration of an exemplary output page.

In first block 210, the system 100 receives user input. FIG. 14B is an illustration of the exemplary user input page 212. The user input page 212 is configured to receive an identification of a gamer, a title, and/or an achievement.

Returning to FIG. 14A, in decision block 215, the system 100 determines whether the user input specifies a gamer. When the user input specifies a gamer, the system 100 advances to block 245. When the user input does not specify a gamer, the system 100 advances to decision block 220.

In decision block 220, the system 100 determines whether the user input specifies an achievement. When the user input specifies an achievement, the system 100 advances to block 235. When the user input does not specify an achievement, the system 100 advances to decision block 225.

In decision block 225, the system 100 determines whether the user input specifies a title. When the user input specifies a title, the system 100 advances to block 230. When the user input does not specify a title, the system 100 generates no results and the method 200 terminates.

In block 230, the system 100 determines a recommended achievement order. For example, in block 230, the system 100 may determine the recommended achievement order by performing one or more of the methods 1a, 1b, 2a, 2b, 2c, and 3a. Then, the system 100 advances to block 235.

In block 235, the system 100 identifies matching gamers for each achievement identified. If the block 235 is performed immediately after the decision block 220, the system 100 identifies matching gamers for each achievement specified in the user input. If the block 235 is performed immediately after the block 230, the system 100 identifies matching gamers for each achievement identified in the recommended achievement order determined in block 230. In block 235, the system 100 may identify the matching gamers by consulting the database 120 of the system 100, which contains an index mapping most-needed achievements to gamers. Then, the system 100 advances to block 240.

In decision block 245, the system 100 determines whether the user input specifies an achievement. When the user input specifies an achievement, the system 100 advances to block 265. When the user input does not specify an achievement, the system 100 advances to decision block 250.

In decision block 250, the system 100 determines whether the user input specifies a title. When the user input specifies a title, the system 100 advances to block 260. When the user input does not specify a title, the system 100 advances to block 255.

In block 255, the system 100 determines a recommended title order. For example, in block 255, the system 100 may determine the recommended title order by performing the method 4a (see FIG. 12A). Then, the system 100 advances to block 260.

In block 260, the system 100 determines a recommended achievement order for the gamer for each title. For example, in block 260, the system 100 may perform one or more of the methods 1a, 1b, 2a, 2b, 2c, and 3a. If the block 260 is performed immediately after the decision block 250, the system 100 identifies a recommended achievement order for each title specified in the user input. If the block 260 is performed immediately after the block 255, the system 100 identifies a recommended achievement order for each title identified in the recommended title order determined in block 255. Then, the system 100 advances to block 265.

In block 265, the system 100 identifies, for each achievement identified, matching gamers for the gamer specified in the user input. If the block 265 is performed immediately after the decision block 245, the system 100 identifies matching gamers (for the gamer specified in the user input) for each achievement specified in the user input. If the block 265 is performed immediately after the block 260, the system 100 identifies matching gamers (for the gamer specified in the user input) for each achievement identified in the recommended achievement order determined in block 260. In block 265, the system 100 may identify the matching gamers by consulting the database 120 of the system 100, which contains an index mapping most-needed achievements to gamers. Then, the system 100 advances to block 240.

In block 240, the system 100 displays output to the user. The output may include the gamers identified in block 235 or block 265. By way of a non-limiting example, the output may be displayed in the output page 242 illustrated in FIG. 14C. The output page 242 illustrates gamers identified based on the user input received in block 210. In this example, two titles are displayed: "Fun Adventures," and "Mega Zombie Blaster IV." Two achievements are displayed for the first title "Fun Adventures:" "find 200 world peanuts," and "eat 100 world3 carrots." Two gamers are displayed for the first achievement "find 200 world peanuts:" gamer1 and gamer2. Three gamers are displayed for the second achievement "eat 100 world3 carrots:" happygolucky17, gamer1, and gamer2. Two achievements are displayed for the second title "Mega Zombie Blaster IV:" "blow em up," and "blow even more of em up." Two gamers are displayed for the first achievement "blow em up:" megagamer667 and gamer2. Two gamers are displayed for the second achievement "blow even more of em up:" happygolucky17 and gamer1.

Returning to FIG. 14A, the method 200 terminates after block 240.

As mentioned above, results may be augmented or refined using additional criteria including but not limited to traditional criteria such as explicit preferences, calculated skill level, online presence, score, etc.

In whole, this application describes multiple unique systems and methods that may be used to implement an achievement guided recommendation system.

Computing Device

Figure 15:
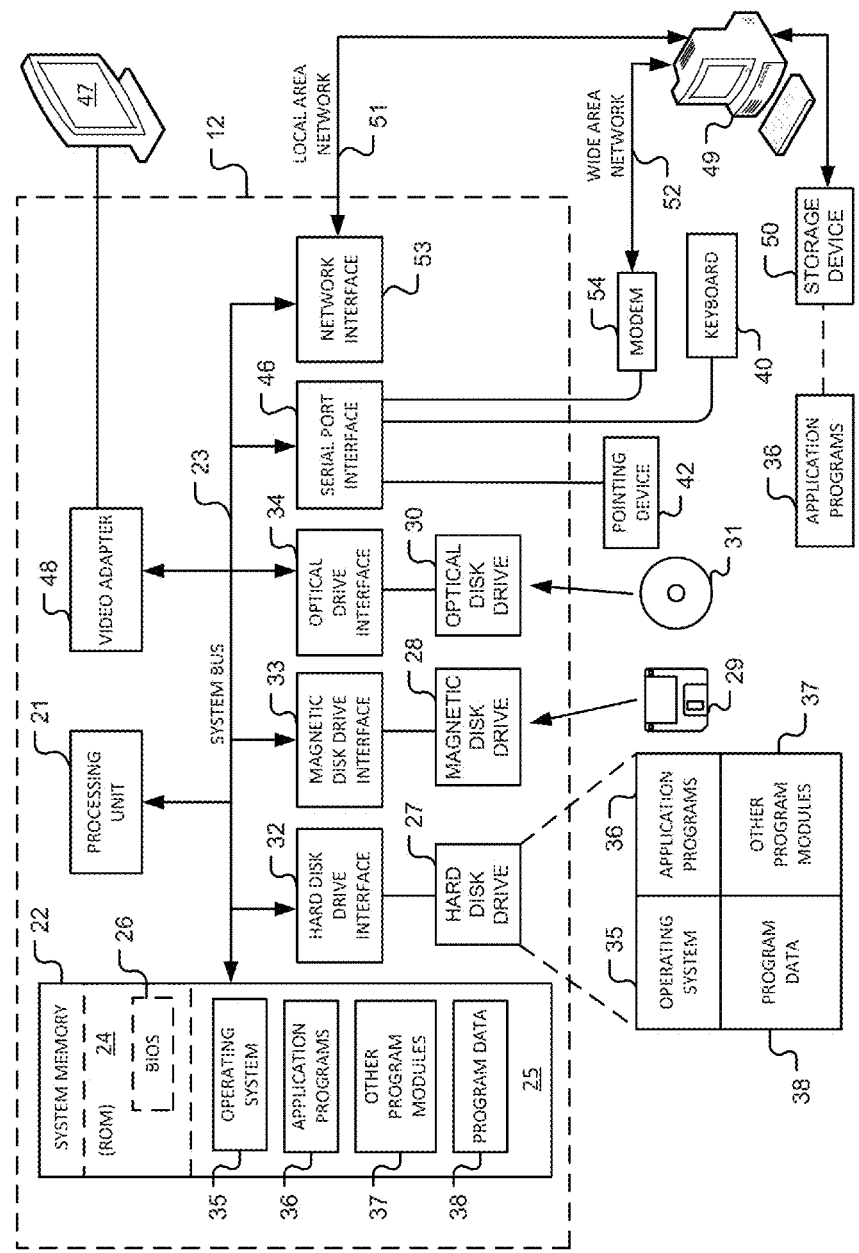
FIG. 15 is a diagram of hardware and an operating environment in conjunction with which implementations of the computing devices and network of the system of FIG. 1 may be practiced.

FIG. 15 is a diagram of hardware and an operating environment in conjunction with which implementations of the one or more computing devices of the system 100 may be practiced. The description of FIG. 15 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 15 includes a general-purpose computing device in the form of the computing device 12. Each of the computing devices of FIG. 1 (including the computing devices of the subsystems 110, and the computing device implementing the database 120, the web crawler 130, the local server 150, each of the client computing devices 170, the computing devices implementing the data sources 125, such as the one or more web servers 140 and the external server 160, and the computing device(s) implementing the service provider 190) may be substantially identical to the computing device 12. By way of other non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 15 include a local-area network (LAN) 51 and a wide-area network (WAN) 52. Such networking environments are commonplace in offices, enterprise-wide computer networks, intranets and the Internet. The network and/or interface 180 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the methods 1a, 1b, 2a, 2b, 2c, 2d, 3a, 4a, 4b, 200, and 500 illustrated in FIGS. 5A, 6A, 7B, 7C, 7D, 7E, 9, 12A, 12C, 14A, and 16 respectively) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method comprising:
obtaining, by at least one computing device, an achievement dependency graph that comprises a plurality of vertices, a plurality of edges, and a plurality of weights, each of the plurality of vertices representing a different achievement of a plurality of achievements, each of the plurality of edges being associated with one of the plurality of weights and connecting a different first one of the plurality of vertices with a different second one of the plurality of vertices;
obtaining, by at least one computing device, data identifying a plurality of users and which of the plurality of achievements each of the plurality of users has earned;
generating, by the at least one computing device, an ordered achievement list based at least in part on the weight associated with each of at least a portion of the plurality of edges;
defining, by the at least one computing device, a recommended achievement list for each of the plurality of users by removing from the ordered achievement list any of the plurality of achievements identified in the data as having been earned by the user;
identifying, by the at least one computing device, a selected achievement; and
identifying, by the at least one computing device, as a set of similar users any of the plurality of users whose recommended achievement list includes the selected achievement.

2. The computer-implemented method of claim 1, further comprising:
displaying, by the at least one computing device, information identifying the set of similar users.

3. The computer-implemented method of claim 1, further comprising:

before identifying the set of similar users, and for each of the plurality of users, associating a parent achievement with each achievement of at least a portion of the user's recommended achievement list, and removing any achievement from the user's recommended achievement list associated with a particular parent achievement that the data does not indicate was earned by the user.

4. The computer-implemented method of claim 1, wherein identifying the selected achievement comprises:
receiving an identification of a selected user via a user input device; and
selecting an achievement from the selected user's recommended achievement list.

5. The computer-implemented method of claim 1, wherein identifying the selected achievement comprises receiving an identification of the selected achievement via a user input device.

6. The computer-implemented method of claim 1, wherein for each of the plurality of users, the data indicates an order in which the user earned any achievements identified by the data as having been earned by user,
at least one of the plurality of users earned the achievement represented by the first vertex before the achievement represented by the second vertex,
for each of the plurality of edges, the weight associated with the edge represents a number of times the achievement represented by the second vertex was earned immediately after the achievement represented by the first vertex by the plurality of users, and
the method further comprises constructing the achievement dependency graph using the data.

7. The computer-implemented method of claim 1, further comprising:
storing the achievement dependency graph in at least one table.

8. The computer-implemented method of claim 1, wherein generating the ordered achievement list comprises identifying a path along the portion of the plurality of edges that visits at least a portion of the plurality of vertices, an order in which the portion of the vertices are visited defining the ordered achievement list.

9. The computer-implemented method of claim 8, wherein the path has a start, and identifying the path comprises:
identifying a current vertex, the achievement represented by the current vertex having been earned before at least one other of the plurality of achievements, and being connected by at least one of the plurality of edges to one of the plurality of vertices representing the at least one other of the plurality of achievements;
adding the achievement represented by the current vertex to the path at the start;
identifying a set comprising at least one of the plurality of vertices connected to the current vertex representing an achievement that was earned after the achievement represented by the current vertex;
associating each vertex in the set with a cumulative weight value determined as a function of the weight associated with the edge connecting the vertex to the current vertex;
selecting a next vertex from the set based on the cumulative weight value associated with each vertex in the set;
adding the achievement represented by the next vertex to the path after the achievement represented by the current vertex;
replacing the current vertex with the next vertex; and
after the current vertex is replaced, repeating the identification of the set, the association of each vertex in the set with a cumulative weight value, the selection of the next vertex, addition of the achievement represented by the next vertex to the path, and the replacement of the current vertex until the achievement represented by the current vertex was not earned before at least one other of the plurality of achievements.

10. The computer-implemented method of claim 9, further comprising removing the next vertex from the set.

11. The computer-implemented method of claim 9, wherein when the identification of the set is repeated, if a particular one of the at least one of the plurality of vertices connected to the current vertex representing an achievement that was earned after the achievement represented by the current vertex is already a member of the set, the weight associated with the edge connecting the particular vertex to the current vertex is added to the cumulative weight value associated with the particular vertex.

12. The computer-implemented method of claim 9, wherein the path has an end, and identifying the path further comprises:
if after the current vertex is replaced, the achievement represented by the current vertex was not earned before any other of the plurality of achievements, and one or more of the plurality of achievements has not been added to the path, adding the one or more of the plurality of achievements to the path at the end.

13. The computer-implemented method of claim 9, wherein identifying the path further comprises:
before each selection of the next vertex, performing a unification process that excludes from the selection any of the plurality of achievements earned after the achievement represented by the current vertex that are:
connected to the achievement represented by the current vertex, and
connected to any other of the plurality of achievements earned after the achievement represented by the current vertex that are also connected to the current vertex.

14. The computer-implemented method of claim 13, further comprising:
before each selection of the next vertex, excluding from the selection each of the plurality of vertices that:
represents an achievement earned after the achievement represented by the current vertex, and
has a connection with the current vertex represented by one of the plurality of edges associated with a weight below a threshold value.

15. The computer-implemented method of claim 14, wherein the threshold value is calculated as a function of the weight associated with each of the plurality of edges representing a connection between the current vertex and any other of the plurality of vertices that represents an achievement earned after the achievement represented by the current vertex.

16. The computer-implemented method of claim 15, wherein the threshold value is a product of a scalar value and an average weight associated with each of the plurality of edges representing a connection between the current vertex and any other of the plurality of vertices that represents an achievement earned after the achievement represented by the current vertex.

17. The computer-implemented method of claim 16, wherein the scalar value is 0.05.

18. A system comprising:
a database storing data and an achievement dependency graph, the achievement dependency graph comprising a plurality of vertices, a plurality of edges, and a plurality of weights, each of the plurality of vertices representing a different achievement of a plurality of achievements, each of the plurality of edges being associated with one of the plurality of weights and connecting a different first one of the plurality of vertices with a different second one of the plurality of vertices, the data identifying a plurality of users and which of the plurality of achievements each of the plurality of users has earned; and
one or more computing devices configured to:
obtain the data and the achievement dependency graph from the database,
generate an ordered achievement list based at least in part on the weight associated with each of at least a portion of the plurality of edges,
define a recommended achievement list for each of the plurality of users by removing from the ordered achievement list any of the plurality of achievements identified in the data as having been earned by the user;
identify a selected achievement; and
identify as a set of similar users any of the plurality of users whose recommended achievement list includes the selected achievement.

19. The system of claim 18, wherein for each of the plurality of users, the data indicates an order in which the user earned any achievements identified by the data as having been earned by user,
at least one of the plurality of users earned the achievement represented by the first vertex before the achievement represented by the second vertex,
for each of the plurality of edges, the weight associated with the edge represents a number of times the achievement represented by the second vertex was earned immediately after the achievement represented by the first vertex by the plurality of users, and
the one or more computing devices are further configured to construct the achievement dependency graph using the data and store the achievement dependency graph in the database.

20. The system of claim 18, wherein the one or more computing devices are further configured to transmit information to an external computing device for analysis thereby.

21. The system of claim 18, wherein the database is configured to receive new data from one or more data sources, the new data identifying a portion of the plurality of users and at least one of the plurality of achievements earned by each user in the portion of the plurality of users, and
the one or more computing devices are further configured to update the achievement dependency graph using the new data and store the updated achievement dependency graph in the database.

22. The system of claim 21, wherein the one or more data sources comprise at least one of a web server and an external server.

23. The system of claim 22, wherein the database is configured to receive the new data from the one or more data sources via at least one of a web crawler and a local server.

24. The computer-implemented method of claim 1, wherein the plurality of achievements were earned from at least one of an electronic game, an electronic product, or an electronic service.

25. The computer-implemented method of claim 1, further comprising:
classifying, by the at least one computing device, each of the set of similar users with a first classification.

26. The computer-implemented method of claim 25, wherein the selected achievement is a first selected achievement, and the method further comprises:
identifying, by the at least one computing device, a second selected achievement that is more difficult to earn than the first selected achievement; and
classifying, by the at least one computing device, those of the plurality of users who have earned the second selected achievement with a second classification, the second classification being different than the first classification.

27. At least one non-transitory computer-readable medium comprising instructions that when executed by one or more processors causes the one or more processors to perform a method comprising:
obtaining an achievement dependency graph that comprises a plurality of vertices, a plurality of edges, and a plurality of weights, each of the plurality of vertices representing a different achievement of a plurality of achievements, each of the plurality of edges being associated with one of the plurality of weights and connecting a different first one of the plurality of vertices with a different second one of the plurality of vertices;
obtaining data identifying a plurality of users and which of the plurality of achievements each of the plurality of users has earned;
generating an ordered achievement list based at least in part on the weight associated with each of at least a portion of the plurality of edges;
defining a recommended achievement list for each of the plurality of users by removing from the ordered achievement list any of the plurality of achievements identified in the data as having been earned by the user;
identify a selected achievement; and
identifying as a set of similar users any of the plurality of users whose recommended achievement list includes the selected achievement.

* * * * *